United States Patent [19]

Sadakata

[11] Patent Number: 5,916,026
[45] Date of Patent: Jun. 29, 1999

[54] ELASTIC UNIVERSAL JOINT

[75] Inventor: Kiyoshi Sadakata, Sawa-gun, Japan

[73] Assignee: NSK Ltd., Tokyo, Japan

[21] Appl. No.: 08/978,574

[22] Filed: Nov. 26, 1997

Related U.S. Application Data

[63] Continuation of application No. 08/568,235, Dec. 6, 1995, abandoned.

[30] Foreign Application Priority Data

Dec. 16, 1994 [JP] Japan ................................. 6-313666
Jan. 25, 1995 [JP] Japan ................................. 7-010050

[51] Int. Cl.$^6$ ............................. F16D 3/76; B62D 1/16
[52] U.S. Cl. ............................. 464/89; 74/492; 464/160
[58] Field of Search ............................. 464/89, 162, 180, 464/136, 91, 92, 182, 157, 147, 150; 74/492; 280/777

[56] References Cited

U.S. PATENT DOCUMENTS

| | | | |
|---|---|---|---|
| 3,878,695 | 4/1975 | Pitner ......................................... | 464/89 |
| 4,183,258 | 1/1980 | Stephan ..................................... | 74/492 |
| 4,385,897 | 5/1983 | Mallet ....................................... | 464/89 |
| 4,406,640 | 9/1983 | Franklin et al. .......................... | 464/91 |
| 4,479,786 | 10/1984 | De Bisschop .............................. | 464/89 |
| 4,983,143 | 1/1991 | Sekine et al. ............................. | 464/89 |
| 5,086,661 | 2/1992 | Hancock ................................. | 464/89 X |
| 5,259,818 | 11/1993 | Kachi et al. ........................ | 464/180 X |
| 5,366,413 | 11/1994 | Yamaguchi et al. ...................... | 464/89 |

FOREIGN PATENT DOCUMENTS

| | | |
|---|---|---|
| 0 392 858 | 10/1990 | European Pat. Off. . |
| 2614985 | 11/1988 | France . |
| 2637334 | 4/1990 | France ..................................... 464/89 |
| 54-82257 | 6/1979 | Japan . |
| 56-39325 | 4/1981 | Japan . |
| 3-168415 | 7/1991 | Japan ..................................... 464/89 |
| 4-42924 | 4/1992 | Japan . |
| 5-83462 | 11/1993 | Japan . |
| 5-89964 | 12/1993 | Japan . |
| 6-329033 | 11/1994 | Japan . |
| 857420 | 12/1960 | United Kingdom . |
| 2 057 632 | 4/1981 | United Kingdom . |

OTHER PUBLICATIONS

Abstract and drawings from French Patent 2,614,985, Nov. 1988.

*Primary Examiner*—Eileen Dunn Lillis
*Attorney, Agent, or Firm*—Shapiro and Shapiro

[57] ABSTRACT

An elastic universal joint is constructed to prevent an interference between a front end surface of a shaft and a front edge of a second arm of a second yoke irrespective of an intersecting angle between two first and second yokes without increasing a size of the first yoke. For this purpose, a concave portion is formed in the front end surface of the shaft, and, in a state where the intersecting angle between the first and second yokes increases and a front edge of the second arm approaches closest to the front end surface thereof, this front edge enters the concave portion. A distance between a cross shaft and the front end surface is reduced corresponding to a depth of the concave portion, and the first yoke is downsized with a smaller weight, correspondingly.

28 Claims, 16 Drawing Sheets

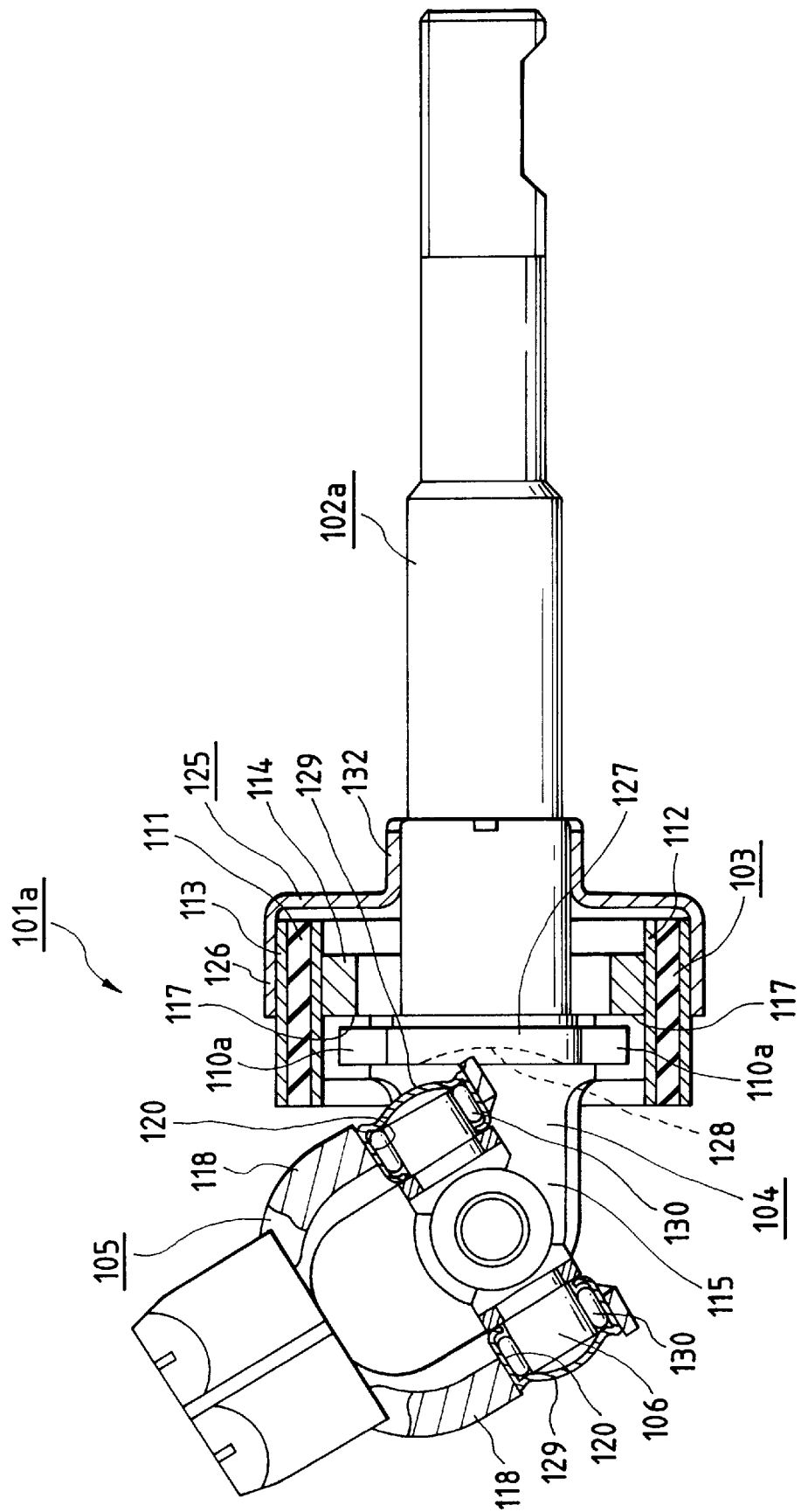

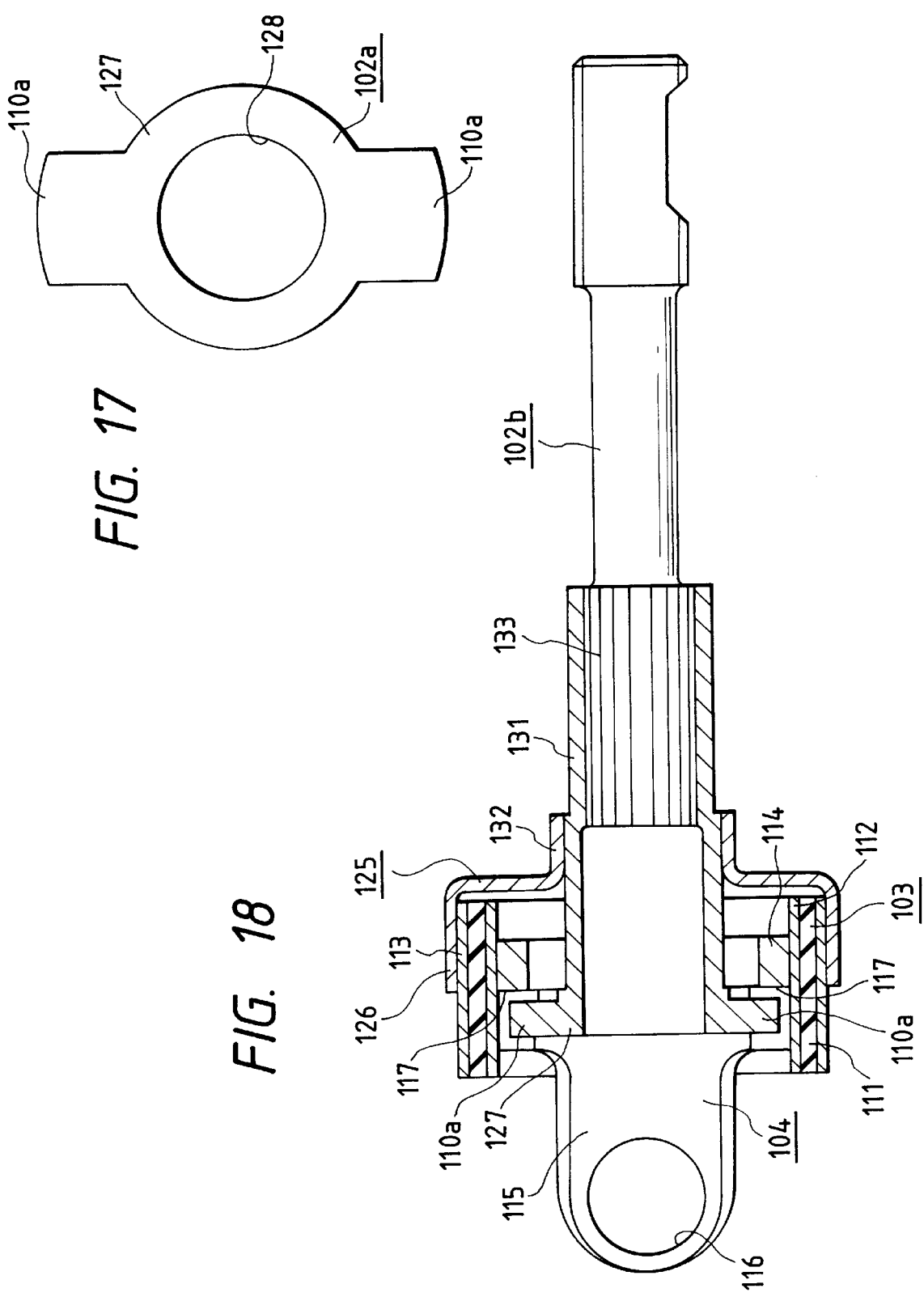

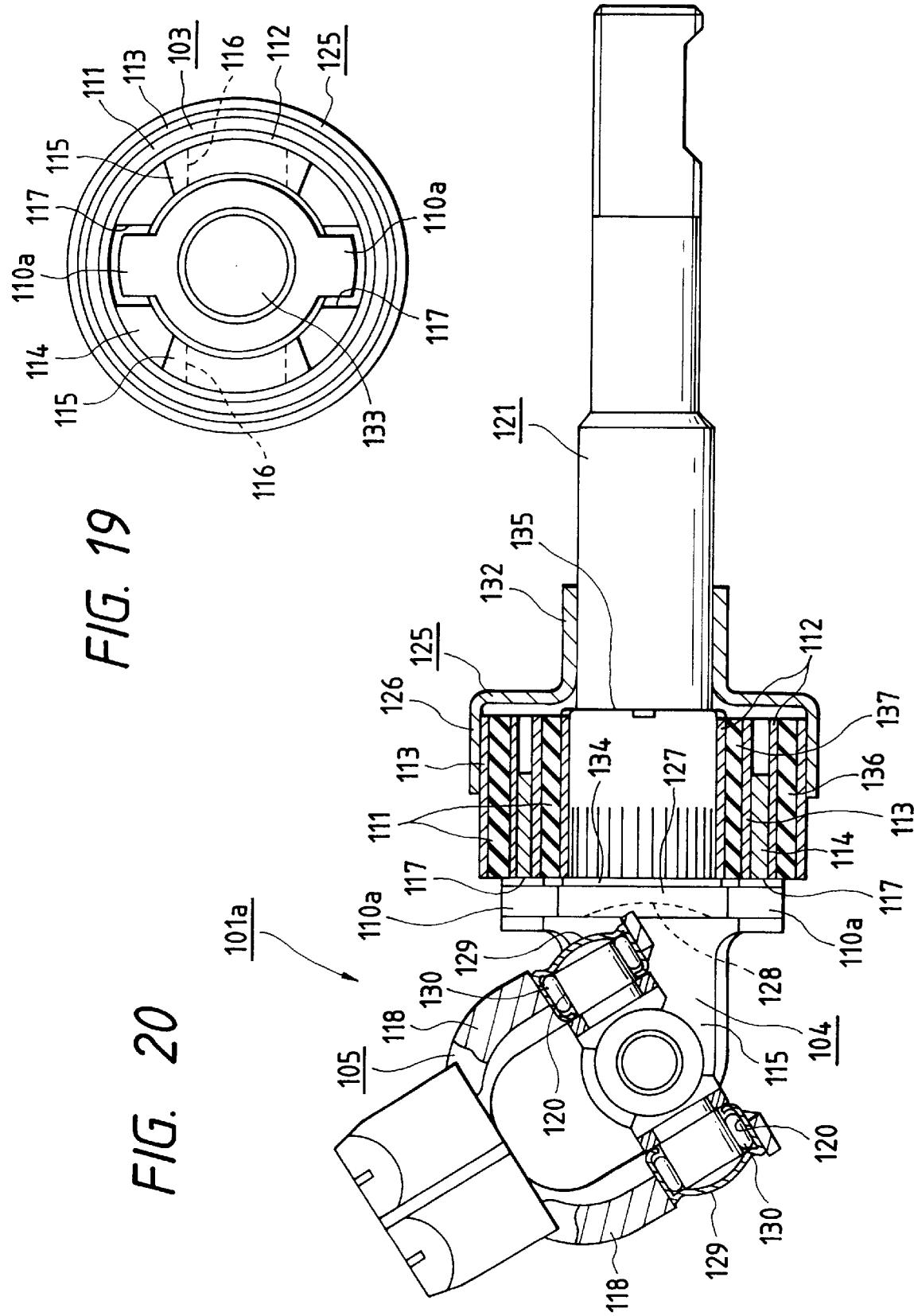

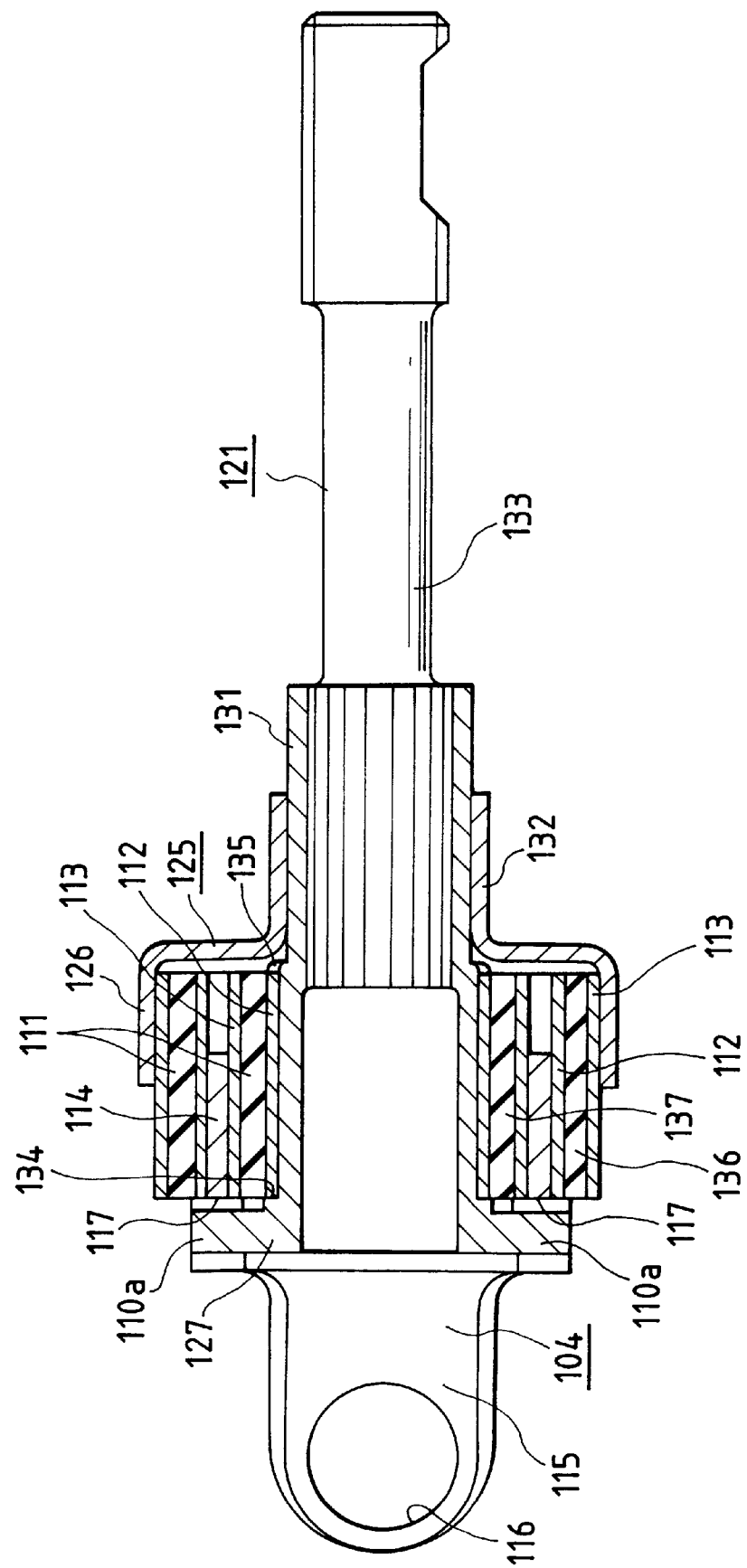

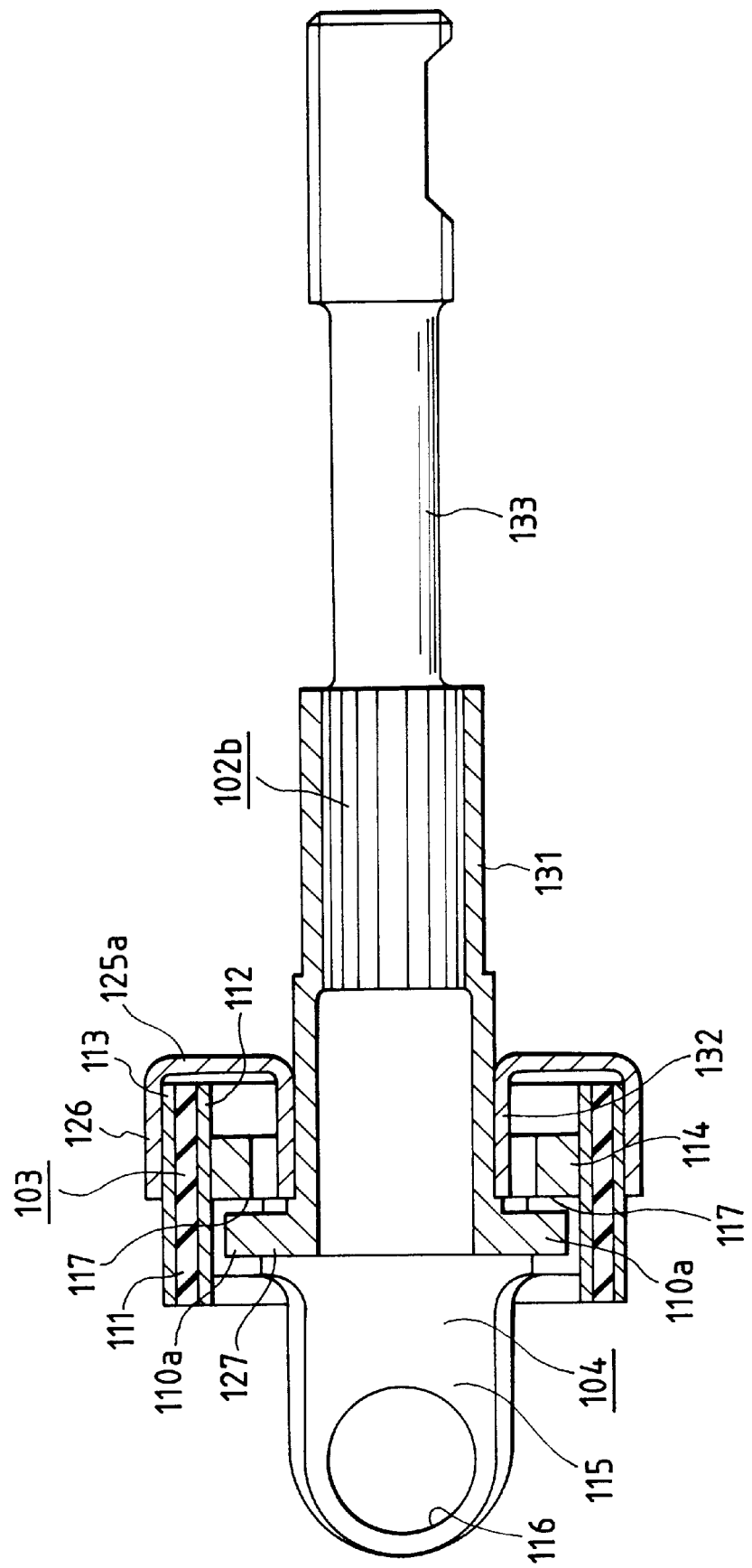

ELASTIC UNIVERSAL JOINT

This is a continuation of application Ser. No. 08/568,235 filed Dec. 6, 1995, now abandoned.

BACKGROUND OF THE INVENTION

1. Field of the Invention

The present invention relates to an elastic universal joint incorporated into a steering apparatus for an automobile and serving to make a motion of a steering wheel freely transmittable to a steering gear but serving to prevent vibrations of the steering gear from being transferred to the steering wheel.

2. Related Background Art

The automobile steering apparatus is constructed to transmit a motion of a steering shaft rotationally driven by a steering wheel to a steering gear and to give a steering angle to a front wheel. It is common that the steering shaft and an input shaft of the steering gear cannot be arranged on the same straight line. For this reason, a universal joint is provided between the steering shaft and the input shaft, with the result that the motion of the steering wheel is freely transmittable to the steering gear. Further, it has hitherto been practiced that the universal joint was provided with a vibration absorbing ability to prevent a driver from undergoing jarring vibrations transmitted to the steering wheel via the steering gear from the wheels when the automobile would be running. Giving the vibration absorbing ability to the universal joint typically involves the use of a so-called elastic universal joint constructed by incorporating an elastic material such as rubber, etc. into this universal joint so as to prevent the transmission of the vibrations with this elastic material.

Joints conventionally known as this type of elastic universal joints are disclosed in Japanese Patent Laid-Open Application No. 56-39325 (French Patent Laid-Open No. 2464404), Japanese Utility Model Laid-Open Application Nos. 54-82257, 5-83462 and 5-89964 and French Patent Laid-Open No. 2614985. Those conventionally known elastic universal joints have substantially the same structure, and hence a structure of the universal joint disclosed in Japanese Patent Laid-Open Application No. 5-89964 among them will be explained with reference to FIGS. 13 to 15.

This elastic universal joint 1, as illustrated in FIG. 13, includes a shaft 2, a first yoke 4 externally fixed to a front end (a left end in FIGS. 13 and 14) of this shaft 2 through a buffer drum 3, second yoke 5 and a cross shaft 6 for connecting this second yoke 5 to the first yoke 4. A serration shaft 7 is, as depicted in FIGS. 14 and 15, formed at a portion protruding from one end of the buffer drum 3 at the front end of the shaft 2. This serration shaft 7 is serration-engaged with a central bore 9 of a transmission member 8. Accordingly, this transmission member 8 is fixedly provided at the front end of the shaft 2 and rotates together with this shaft 2. Further, protruded segments 10, 10 protruding outward the outer peripheral surface of the buffer drum 3 in the diametrical direction are integrally formed in diametrically opposite positions on the circumference of this transmission member 8.

Among the respective members constituting the elastic universal joint 1, the buffer drum 3 is formed in a cylindrical shape including an elastic material 11 such as rubber, elastomer, etc. That is, this buffer drum 3 is constructed of an internal sleeve 12 and an external sleeve 13 that are each composed of a metal in a cylindrical shape, and these sleeves 12, 13 are disposed concentrically with each other. Then, an outer peripheral surface of the internal sleeve 12 is connected to an inner peripheral surface of the elastic material 11 by baking or bonding, and an inner peripheral surface of the external sleeve 13 is similarly connected to an outer peripheral surface of the elastic material 11. Subsequently, the internal sleeve 12 is fixedly fitted to a front end of the shaft 2, and the external sleeve 13 is internally fixedly fitted to a cylindrical portion 14 of the first yoke 4.

The first yoke 4 includes a pair of first arms 15, 15 extending in an axial direction from diametrically opposite positions of one edge (a left edge in FIGS. 13 and 14) of this cylindrical portion 14 in the axial direction (right-and-left directions in FIGS. 13 and 14). First circular holes 16, 16 are formed coaxially with each other near front edges (left edges in FIGS. 13 and 14) of the first arms 15, 15. Further, notches 17, 17 are formed in the diametrically opposite positions of edge of the cylindrical unit 14 but in areas displaced from the pair of first arms 15, 15. A width dimension W of each of those notches 17, 17 is larger than a width dimension w (W>w) of each of the protruded segments 10, 10 of the transmission member 8. Then, in a state where the shaft 2 is assembled inwardly of the first yoke 4, the protruded segments 10, 10 are received with clearance in the notches 17, 17.

Further, the second yoke 5 includes a pair of second arms 18 spaced away from each other and is fixedly connected to an end of another shaft 19. Second circular holes 20 are formed coaxially with each other near front edges of the second arms 18. Then, four ends of the cross shaft 6 are rotatably supported inwardly of the first and second circular holes 16, 20 through bearings such as radial needle bearings.

The following describes an operation of the thus constructed elastic universal joint 1. When an automobile runs straight, or when a rotational torque applied to the shaft 2 from a steering wheel is small, the protruded segments 10, 10 of the transmission member 8 fixed to the front end of the shaft 2 exist in neutral positions or positions deviating a bit from the neutral positions inwardly of the notches 17, 17 formed in the cylindrical portion 14 of the first yoke 4. In each of those states, the cylindrical portion 14 does not directly contact the transmission member 8 at all. Further, the small rotational torque is transmitted from the shaft 2 via the buffer drum 3 to the first yoke 4. In this case, the elastic material 11 of the buffer drum 3 absorbs the vibrations transferred from the wheels to the first yoke 4 via the steering gear, shaft 19, the second yoke 5 and the cross shaft 6, with the result that the vibrations are not transmitted to the shaft 2.

In contrast with this, when the rotational torque applied to the shaft 2 from the steering wheel is larger as in the case of giving a large steering angle to the front wheel, the respective protruded segments 10, 10 impinge on the inner surfaces of the notches 17, 17. As a result, a large proportion of the rotational torque applied from the steering wheel to the shaft 2 is transmitted via the transmission member 8 to the first yoke 4. In this state, the rotational torque transmitted via the buffer drum 3 is limited. Accordingly, even if the rotational torque transmitted via the elastic universal joint 1 increases, there is eliminated such a possibility that an excessive force acts on the elastic material 11 enough to damage this elastic material 11.

Further, Japanese Patent Laid-Open Application No. 4-42924 discloses an elastic universal joint as shown in FIGS. 23 and 24. The elastic universal joint disclosed in this Publication aims at securing both of a steering stability and a vibration attenuating performance. In this elastic universal joint, circular holes 123, 123 are formed in diametrically opposite positions near a front edge of a housing member 122 fixedly welded to the end portion of a shaft 121. Then, a proximal end portion of the first yoke 104 is internally fixedly fitted in the inside of a buffer drum 103 internally fixedly fitted in the front of the housing member 122. Further, both edges of a pin 124 penetrating the proximal end portion of the first yoke 104 in the diametrical direction are loosely fitted in the circular holes 123, 123.

In the case of the thus constructed elastic universal joint shown in FIGS. 23 and 24, the small rotational torque is transmitted between the shaft 121 and the first yoke 104 via the elastic material 111 constituting the buffer drum 103. Further, when transmitting the large rotational torque, external peripheral surfaces of two ends of the pin 124 impinge on internal circumferences of the circular holes 123, 123, thereby transmitting the torque via this pin 124.

Moreover, Japanese Patent Laid-Open Application No. 6-329033 discloses an elastic universal joint structured as illustrated in FIG. 25. In the elastic universal joint disclosed in this Publication, both ends of the pin 124 fixed to the shaft 121 are loosely engaged with notches 117 formed in a rear edge of the first yoke 104. Further, the buffer drum 103 is interposed between the inner peripheral surface of the housing member 122 including its proximal end fixed to the shaft 121 and the outer peripheral surface of an intermediate portion of the first yoke 104.

In the case of the thus constructed elastic universal joint shown in FIG. 25, the small rotational torque is transmitted between the shaft 121 and the first yoke 104 via the elastic material 111 of the buffer drum 103. Moreover, when transmitting the large rotational torque, the outer peripheral surfaces of the ends of the pin 124 impinge on the inner edges of the notches 117, thereby transmitting the torque via this pin 124.

In the case of the conventional elastic universal joint constructed as shown in FIGS. 13 to 15, the following problems arise in terms of attaining both downsizing and a reduction in weight. To be specific, if an intersecting angle between central axes of a pair of shafts 2, 19 connected to each other via the elastic universal joint 1 is large, with rotations of these two shafts 2, 19, the second yoke 5 largely swings about one shaft of the cross shaft 6. Then, as a result of this swing, the front edge of a second arm 18 of the second yoke 5 approaches the front end surface of the shaft 2 while describing a circular arc locus.

There is almost no case in which the intersecting angle of the elastic universal joint becomes excessive in an ordinary using state. However, providing an intersecting angle that is required in terms of protecting a driver when in a collision. That is, in the event that the front of the automobile is crushed in a collision, the steering wheel should be prevented from being thrust against the driver, and hence it is a common practice that part of a plurality of shafts constituting a steering apparatus is bendable while absorbing an impact energy in the event of a collision. Then, if part of the shaft is bent, the intersecting angle of the elastic universal joint provided at the end of the relevant shaft reaches approximately 90 degrees. Accordingly, securing the large intersecting angle is needed in terms of protecting the driver by making part of the shaft smoothly bendable.

Under such circumstances, the elastic universal joint 1 is required to incorporate such a function that the front edge of a second arm 18 does not interfere with the front end surface of the shaft 2 even in a state where the front edge comes closest to the front end surface. For preventing such an interference, the second yoke 5 and the shaft 2 have hitherto been spaced far away from each other. More specifically:

(1) the first arms 15, 15 of the first yoke 4 are elongated, and the front edge is spaced far away from the front end surface of the shaft 2 by moving the cross shaft 6 leftward in FIGS. 13 and 14, about which the second arm 18 swings; or alternatively, (2) the cylindrical portion 14 of the first arm 4 is elongated, and the front end surface of the shaft 2 is spaced far away from the second arm 18 by moving the buffer drum 3 and the shaft 2 rightward in FIGS. 13 and 14.

In each of these items (1) and (2), a dimension of the first yoke 4 in the axial direction increases, and this is undesirable because of bringing about rises both in size and weight of the elastic universal joint 1.

In the case of the conventional elastic universal joint, it is difficult to attain steering stability and the vibration attenuating performance and downsizing with a smaller weight. Specifically, in the case of the structure illustrated in FIGS. 13 to 15, the weight thereof can be decreased, but securing both the steering stability and the vibration attenuating performance is difficult. More particularly, an enhancement of the torsional rigidity of the elastic material 11 to secure the steering stability involves increasing the diameter of this elastic material 11 or increasing the hardness of the elastic material 11. In the case of the structure shown in FIGS. 13 to 15, however, the buffer drum 3 including the elastic material 11 is fixedly fitted in the inside of the first yoke 4, and, therefore, the torsional rigidity is hard to enhance with an increased diameter of the elastic material 11. Further, if the elastic material 11 has the increased hardness, it follows that the vibration attenuating performance is deteriorated.

Moreover, in the case of the structure shown in FIGS. 23 and 24, even when the steering stability and the vibration attenuating performance can be secured, it is difficult to reduce the weight. Specifically, in the case of the structure illustrated in FIGS. 23 and 24, the small or large torque is transmitted via the housing member 122, and hence it is required that the rigidity of the housing member 122 be well increased. Accordingly, a plate thickness of the housing member 122 has to sufficiently increase, and a weight of the housing member 122 inevitably rises. Moreover, it is difficult to form the circular holes matching with each other in the housing member 122, the buffer drum 103 and the first yoke 104 (or to match the circular holes previously formed in the respective members 122, 103, 104). As a result, there is a decline in productivity when manufacturing the elastic universal joint.

Further, in the case of the structure illustrated in FIG. 25, it is also difficult to attain steering stability and vibration attenuating performance and decreasing the weight. Specifically, in the case of the structure shown in FIG. 25, the buffer drum 103 and the engaged portions of the two edges of the pin 124 with the notches 117 are so provided as to deviate in the axial direction. Accordingly, if the dimension of the buffer drum 103 in the axial direction is elongated to secure the steering stability and the vibration attenuating performance by increasing a volume of the elastic material 111 of the buffer drum 103, the elastic universal joint increases in size with the result that the weight also rises. Conversely, for downsizing the elastic universal joint and decreasing the weight thereof, the dimension of the buffer drum 103 in the axial direction may be reduced. In this case, the elastic material 111 lacks volume, and it is impossible to secure both the steering stability and the vibration attenuating performance.

SUMMARY OF THE INVENTION

It is a primary object of the present invention to provide an elastic universal joint designed to attain downsizing and a reduction in weight thereof while sufficiently securing functions.

It is another object of the present invention to provide a practicable elastic universal joint capable of securing a steering stability and a vibration attenuating performance with reduced weight.

An elastic universal joint according to the present invention may have the following characteristics (1)–(8).

(1) The elastic universal joint comprises an elastic universal joint comprising a shaft, a first yoke externally fixed fitted to a front end of the shaft through a buffer drum, a second yoke and a cross shaft for connecting the second yoke to the first yoke.

(2) A protruded segment more protruded outward in a diametrical direction than an outer peripheral surface of the buffer drum is fixed on a portion protruding from one edge of the buffer drum at a front end of the shaft.

(3) The buffer drum is formed in a cylindrical shape and includes an elastic material.

(4) The first yoke has a cylindrical member, a pair of first arms extending in an axial direction from opposite positions in a diametrical direction of one edge of the cylindrical member in the axial direction, a pair of circular holes formed coaxially with each other near front edges of the first arms and notches formed at the edge of the cylindrical member in the axial direction in areas away from the pair of first arms.

(5) The second yoke has a pair of second arms spaced away from each other and a pair of second circular holes formed coaxially with each other in front edges of the second arms.

(6) Four ends of the cross shaft are rotatably supported inwardly of the first and second circular holes.

(7) The protruded segment fixed at the front end of the shaft is loosely engaged with the notch formed in the cylindrical member of the first yoke with a gap.

(8) A concave portion or a hole is formed in a central portion of a front end surface of the shaft.

The thus constructed elastic universal joint has the same operations when the rotational torque is transmitted between a pair of shafts disposed on a non-straight line and when preventing a transfer of vibrations as those of the conventional elastic universal joint described above. Especially in the case of the elastic universal joint of the present invention, the concave portion or the hole is formed in the central portion of the front end surface of the shaft, and, correspondingly, even when a distance between this front end surface and the second yoke is reduced, a front edge of the second arm does not interfere with the front end surface of the shaft. Accordingly, the first yoke is not required to be large in order to prevent the interference, thereby making it possible to downsize the elastic universal joint and to decrease its weight.

Another elastic universal joint according to the present invention may have the following characteristics (1)–(7).

(1) The elastic universal joint comprises a shaft, a coupling bracket having its proximal end portion fixedly connected to a close-to-front-end area of an intermediate portion of the shaft, a first yoke internally fitted and supported inwardly of an external cylindrical member provided at a front edge of the coupling bracket through a buffer drum, a second yoke and a cross shaft for connecting the first and second yokes to each other.

(2) A protruded segment more protruded outward in a diametrical direction than an outer peripheral surface of the shaft is fixed on a portion positioned inward in the diametrical direction of the buffer drum at a front end of the shaft, the protruded segment having its edge facing to an inner peripheral surface of the buffer drum.

(3) The buffer drum is formed in a cylindrical shape and includes an elastic material.

(4) The first yoke has an internal cylindrical member internally fixed in said buffer drum, a pair of first arms extending in an axial direction from opposite positions in a diametrical direction of one edge of the internal cylindrical member in the axial direction, a pair of circular holes formed coaxially with each other near front edges of the first arms and notches formed at part of the one edge of the internal cylindrical member in the axial direction but in areas away from the pair of first arms and inward in the diametrical direction of the buffer drum.

(5) The second yoke has a pair of second arms spaced away from each other and a pair of second circular holes formed coaxially with each other near front edges of the second arms.

(6) Four edges of the cross shaft are rotatably supported inwardly of the first and second circular holes (7) The protruded segment fixed at the front end of the shaft is loosely engaged with the notch formed in the internal cylindrical member of the first yoke with a gap.

Another elastic universal joint according to the present invention may have the following characteristics (a)–(g).

(a) The elastic universal joint comprises a shaft, a coupling bracket having its proximal end portion fixed to a close-to-front-end area of an intermediate portion of the shaft, a first yoke supported through internal and external buffer drums between the inside of an external cylindrical member provided at the front end of the coupling bracket and an outer peripheral surface of the front end of the shaft, a second yoke and a cross shaft for connecting the first and second yokes to each other.

(b) A protruded segment more protruded outward in a diametrical direction than an outer peripheral surface of the internal buffer drum is fixed on a portion protruding from one edge of at least the internal buffer drum at a front end of the shaft.

(c) The two internal and external buffer drums are formed in a cylindrical shape, each including an elastic material.

(d) The first yoke has an internal cylindrical member, a pair of first arms extending in the axial direction from opposite positions in a diametrical direction of one edge of the internal cylindrical member in the axial direction, a pair of first circular holes formed coaxially with each other in front edges of the first arms and notches formed at part of the edge of the internal cylindrical member in the axial direction but in areas away from the pair of first arms, the internal cylindrical member being internally fitted and supported inwardly of the external cylindrical member through the external buffer drum and externally fitted and supported at the front end of the shaft.

(e) The second yoke has a pair of second arms spaced away from each other and a pair of second circular holes formed coaxially with each other in front edges of the second arms.

(f) Four ends of the cross shaft are rotatably supported inwardly of the first and second circular holes.

(g) The protruded segment fixed at the front end of the shaft is loosely engaged with the notch formed in the internal cylindrical member of the first yoke with a gap.

Further, in the elastic universal joint according to the present invention, preferably, a concave portion or a hole is formed in the central portion of the front end surface of the shaft.

The thus constructed elastic universal joint has the same operations when the rotational torque is transmitted between the pair of shafts disposed on the non-straight line and when preventing the transfer of the vibrations as those of the conventional elastic universal joint described above. Especially in the case of the elastic universal joint wherein the buffer drum is externally fixed to the internal cylindrical member of the first yoke, a diameter of this buffer drum can be substantially increased. Also, in the elastic universal joint provided with the internal and external buffer drums, the volume of the elastic material can be increased. As a result, even when the hardness of the elastic material is not enhanced, the steering stability can be enhanced by increasing the torsional rigidity.

Furthermore, the coupling bracket including the external cylindrical member in which the buffer drum is internally fixed transmits only the small rotational torque. Large rotational torque is not transmitted through the coupling bracket, but by such an arrangement wherein the protruded segment fixed to the front end of the shaft engages with the notch of the internal cylindrical member constituting the first yoke. Therefore, the coupling bracket is not required to have a particularly large rigidity. For this reason, the coupling bracket can be thin, thereby making it possible to reduce the weight of the elastic universal joint.

Especially in the case of the elastic universal joint of the present invention, wherein the engaged portion between the protruded segment and the notch exists inwardly of the buffer drum, even when securing the length of the buffer drum in the axial direction in order to ensure the volume of the elastic material, the length of the elastic universal joint in the axial direction is not unduly elongated, and the weight of the elastic universal joint can be reduced. Further, the elastic universal joint of the present invention may include dual internal and external buffer drums. It is therefore feasible to secure the volume of the elastic material without increasing the length of the buffer drum in the axial direction and to reduce the weight of the elastic universal joint without increasing the length of the elastic universal joint in the axial direction.

Moreover, the concave portion or the hole is formed in the central portion of the front end surface of the shaft, and, in this case, even when decreasing a distance between the front end surface and the second yoke in proportion to the formation of the concave portion or the hole in the central portion of the front end surface of the shaft, the front edge of the second arm does not interfere with the front end surface of the shaft. Accordingly, there is no need to increase the size of the first yoke to prevent the interference, and the elastic universal joint can be downsized to have a smaller weight.

BRIEF DESCRIPTION OF THE DRAWINGS

Other objects and advantages of the present invention will become apparent during the following discussion in conjunction with the accompanying drawings, in which:

FIG. 16 is a side view partially cut away, showing a fourth embodiment of the present invention;

FIG. 17 is a diagram as viewed from left in FIG. 16, illustrating only the front end of the shaft of FIG. 16;

FIG. 18 is a side view partially cut away, illustrating a portion of a fifth embodiment of the present invention;

FIG. 19 is a diagram as viewed from the left in FIG. 18;

FIG. 20 is a side view partially cut away, showing a sixth embodiment of the present invention;

FIG. 21 is a partially cut-away side view showing a portion of a seventh embodiment of the present invention;

FIG. 22 is a partially cut-away side view showing a portion of an eighth embodiment of the present invention;

DESCRIPTION OF THE PREFERRED EMBODIMENTS

Figure 1:
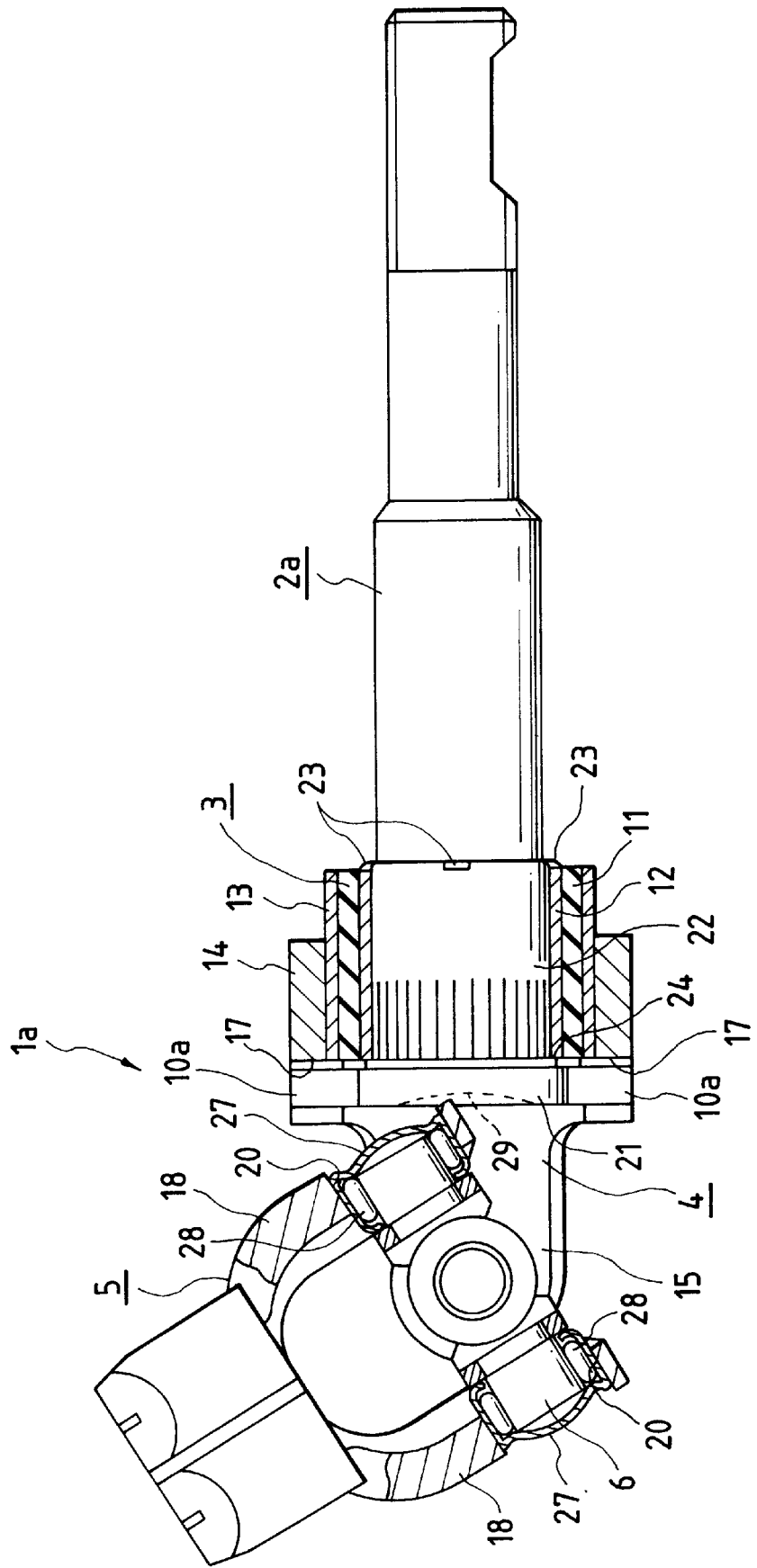
FIG. 1 is a side view partially cut away, illustrating a first embodiment of the present invention.
Figure 2:
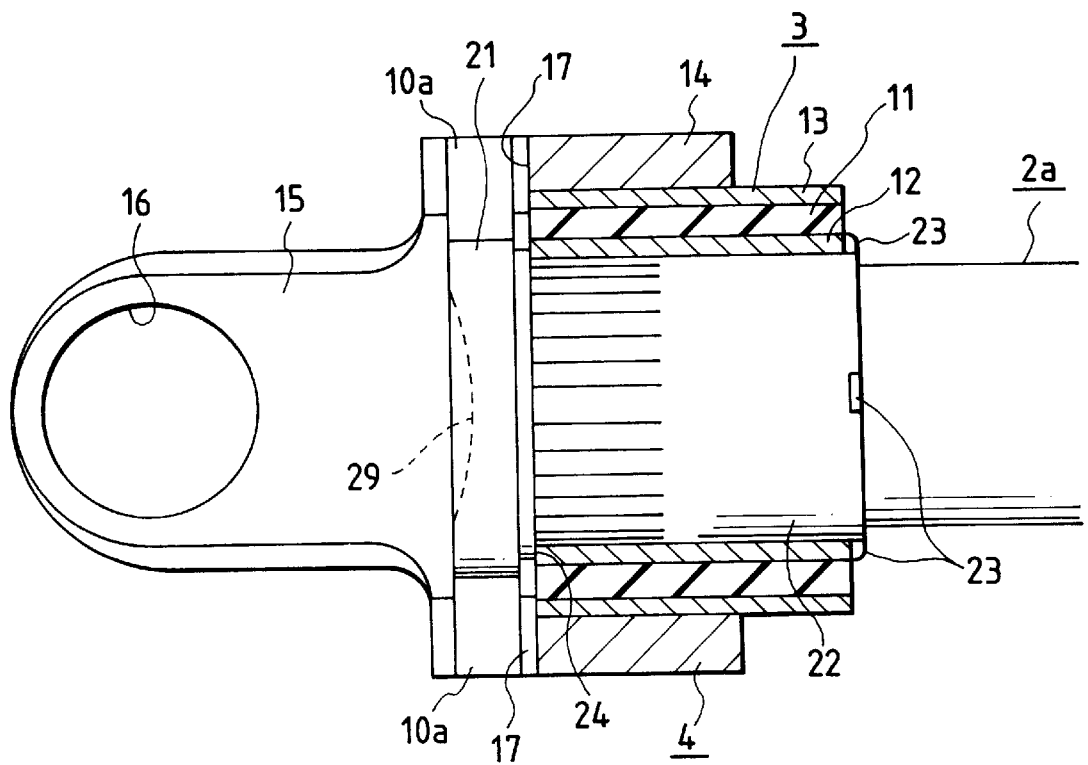
FIG. 2 is an enlarged view of the left part in FIG. 1 but omitting the cross shaft and second yoke omissions.
Figure 3:
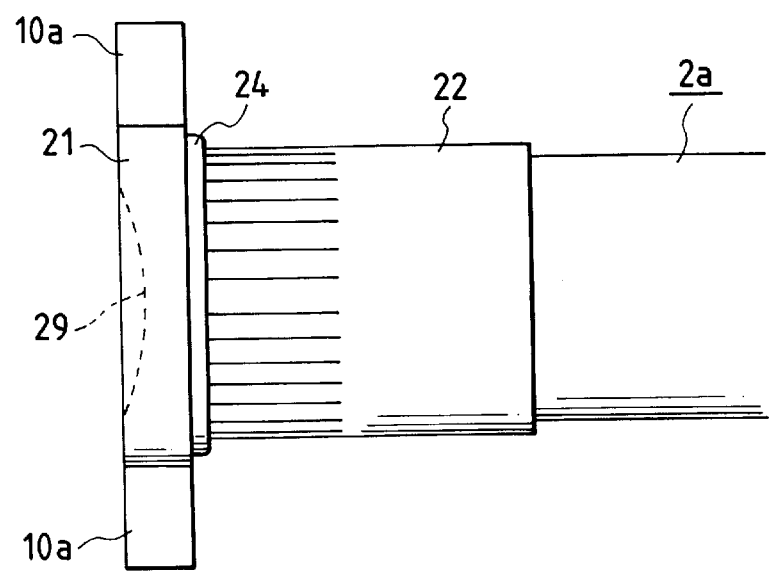
FIG. 3 is a view illustrating only a front end portion of a shaft of FIG. 2.
Figure 4:
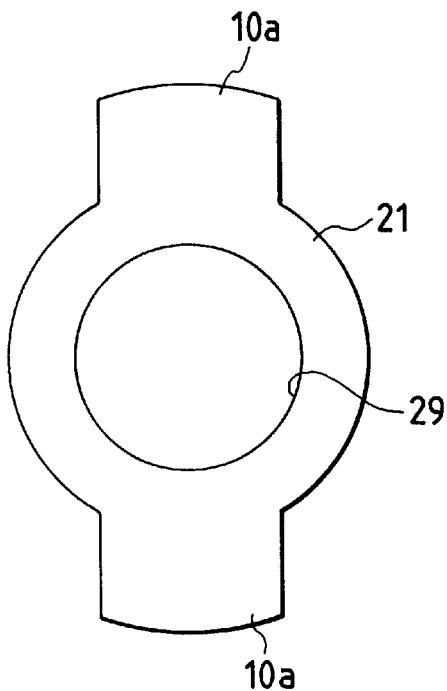
FIG. 4 is a diagram as viewed from left in FIG. 3.

FIGS. 1 to 7 illustrate a first embodiment of the present invention. An elastic universal joint 1*a* according to the present invention includes, as illustrated in FIG. 1, a shaft 2*a*, a first yoke 4 externally fixedly fitted to a front end (a left end in FIGS. 1 and 2) of this shaft 2*a* through a buffer drum 3, a second yoke 5 and a cross shaft 6 for connecting the second yoke 5 to the first yoke 4. A collar-like transmission member 21 as shown in FIG. 4 is formed integrally with the shaft 2*a* by a proper working method such as cold forging working, etc. at a portion protruding from one end (a left end in FIGS. 1 and 2) at the front end of the shaft 2*a*. Further, segments 10*a*, 10*a* protruding outward in the diametrical direction from an outer peripheral surface of the buffer drum 3 and integrally formed in two opposed positions in the diametrical direction on the outer circumference of this transmission member 21.

A concave portion 29 is, as illustrated in FIGS. 1 and 4, formed at the central portion of the transmission member 21 that may be also conceived as the central portion on the front end surface of the shaft 2a. In the case of the illustrative embodiment, this concave portion 29 has a spherical concave surface including its opening taking a circular shape. Accordingly, this concave portion 29 is deepest at its central area but gradually becomes shallower as it approaches the circumference.

Further, the buffer drum 3 is, as in the same way with the conventional structure described above, formed in the cylindrical shape as a whole in such an arrangement that an outer peripheral surface of an internal sleeve 12 is connected to an inner peripheral surface of an elastic material 11 by baking or bonding, and an inner peripheral surface of an external sleeve 13 is similarly connected to an outer peripheral surface of the elastic material 11. Then, the internal sleeve 12 is externally fixedly fitted to the front end portion of the shaft 2a, while the external sleeve 13 is internally fixedly fitted in a cylindrical unit 14 which is attached to the first yoke 4 as will be mentioned later.

Note that the front end portion of the shaft 2a is formed with a large-diameter portion 22 having a larger outer diametrical dimension than other portions exclusive of the above transmission member 21 and a stepped portion 24 formed on a proximal portion (a right end in FIGS. 1 to 3) of this transmission member 21. Then, a fine rugged area is formed on part of the outer peripheral surface of this large-diameter portion 22 by knurling. When the above buffer drum 3 is externally fixedly fitted to the front end portion of the shaft 2a, the shaft 2a is inserted into the internal sleeve 12 of this buffer drum 3 from the proximal portion (the right side in FIG. 1) of this shaft 2a, and the internal sleeve 12 is externally fitted to the large-diameter portion 22 with a sufficient fastening allowance. Further, a front end (a right end in FIGS. 1 and 2) of the internal sleeve 12 impinges on the stepped portion 24, and, in this state, a proximal end (a right end in FIGS. 1 to 3) of the large-diameter portion is caulking-expanded outward in the diametrical direction, thereby forming caulked portions 23, 23. Then, these caulked portions 23, 23 engage with the proximal end (the right end in FIGS. 1 and 2) of the internal sleeve 12. In this state, both of the ends of the internal sleeve 12 in the axial direction (the right-and-left direction in FIGS. 1 and 2) engage with the caulked portions 23, 23 as well as with the stepped portion 24, thus hindering a movement along the axial direction.

In the case of the illustrative embodiment, effects itemized (a), (b) as follows are obtained by providing the fine rugged area, the stepped portion 24 and the caulked portions 23, 23.

(a) It is possible to surely prevent the buffer drum 3 from sliding on the shaft 2a.

(b) Positioning for externally fitting the buffer drum 3 to the shaft 2a is relatively easy. Conventionally, the shaft 2a including the transmission member 21 is manufactured by, e.g., the cold forging working, and, in which case a draft (working degree) is high. Hence, it is a common practice to perform pre-processing by use of a metal soap before a forming process. For this reason, a coefficient of friction on the obtained surface of the shaft 2a decreases, and the internal sleeve 12 slides easily on the large-diameter portion 22 in the peripheral direction and the axial direction as well if the internal sleeve 12 is simply externally fitted to the internal sleeve.

Contrastingly, in the case of the illustrative embodiment, the fine rugged area formed by the knurling serves to increase the coefficient of friction between the outer peripheral surface of the large-diameter portion 22 and the inner peripheral surface of the internal sleeve 12. It is therefore possible to prevent the internal sleeve from sliding on the shaft 2a in the peripheral direction. Further, the two ends of the internal sleeve 12 engage with the stepped portion 24 and the caulked portions 23, 23, thereby preventing the movement along the axial direction. Hence, it is also feasible to prevent this internal sleeve from sliding on the shaft 2a in the axial direction.

Figure 13:
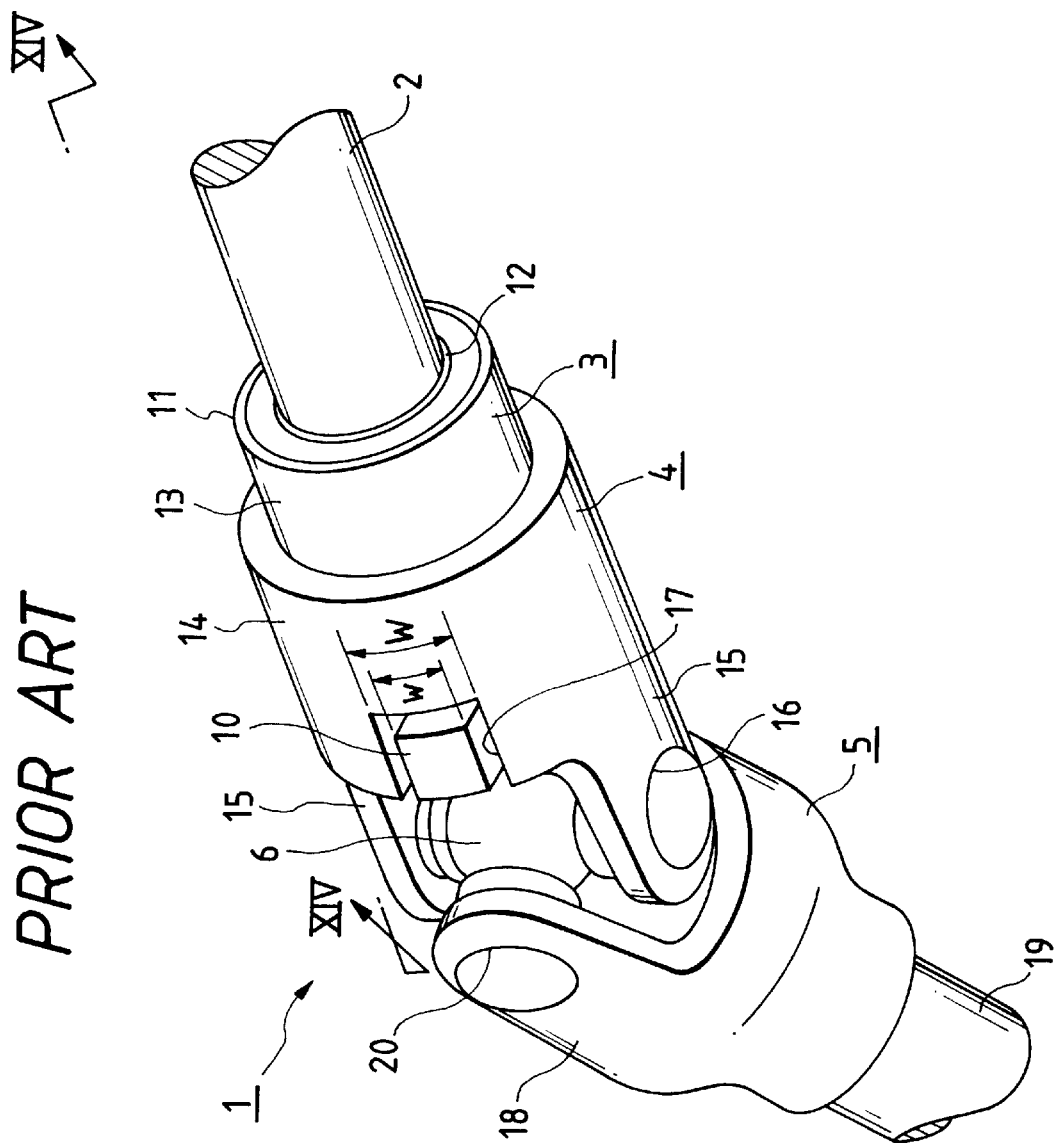
FIG. 13 is a perspective view illustrating one example of a conventional structure.
Figure 14:
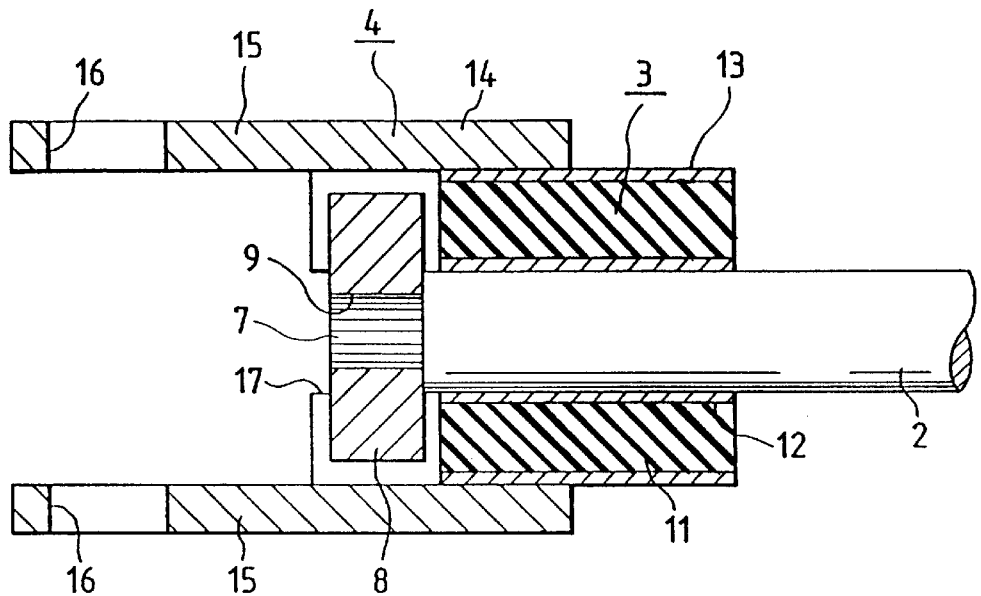
FIG. 14 is a sectional view taken substantially along the line XIV—XIV of FIG. 13, but omitting the cross shaft and the second yoke.
Figure 15:
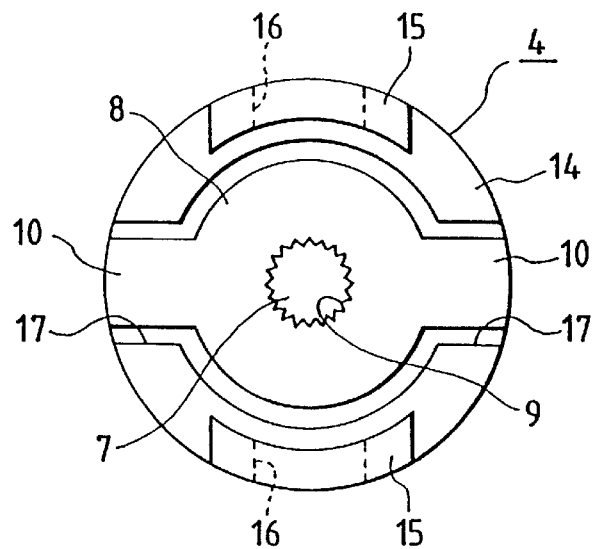
FIG. 15 is a diagram as viewed from left in FIG. 14.
Figure 23:
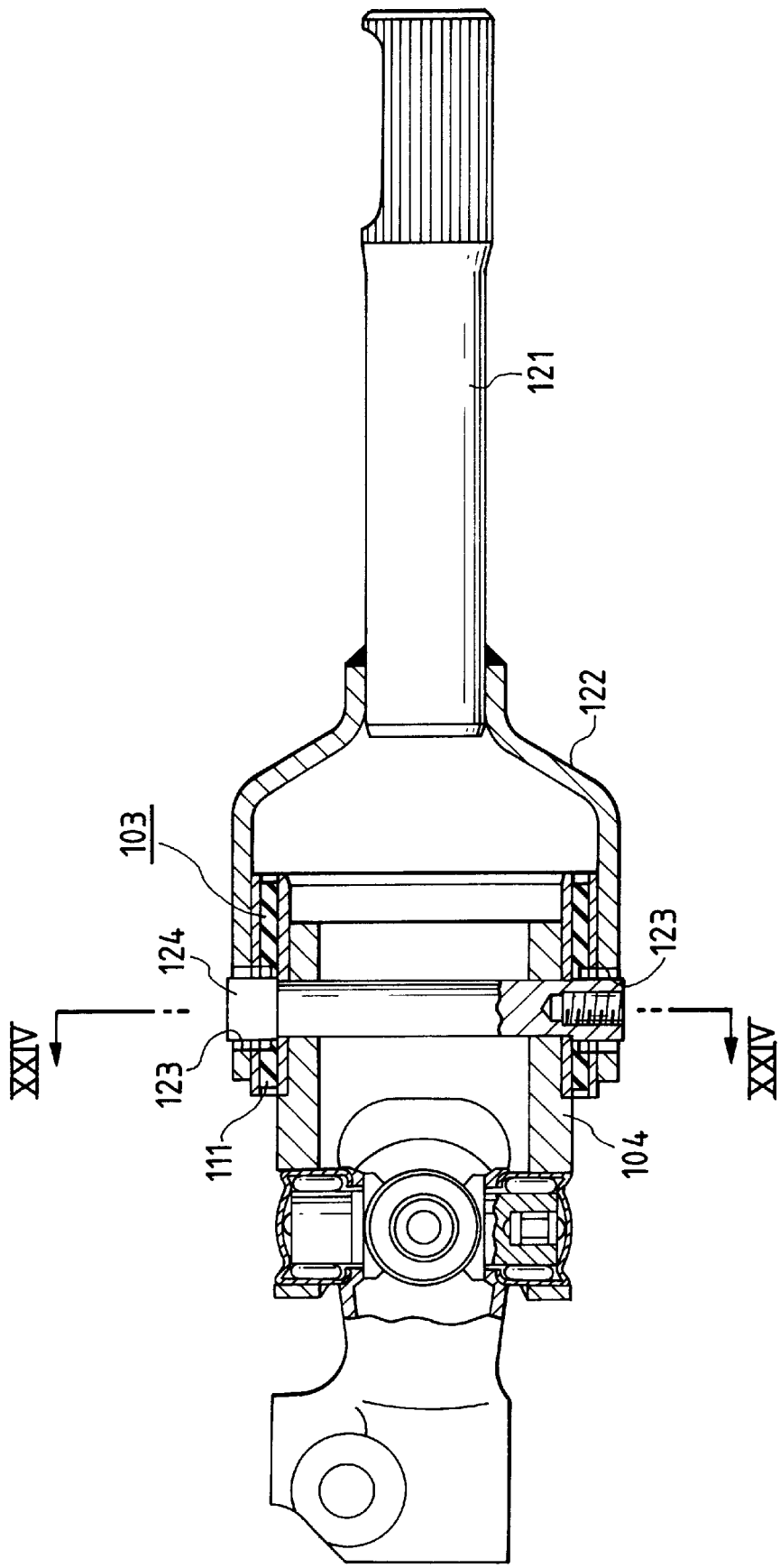
FIG. 23 is a partially cut-away side view illustrating a second example of the conventional structure.
Figure 24:
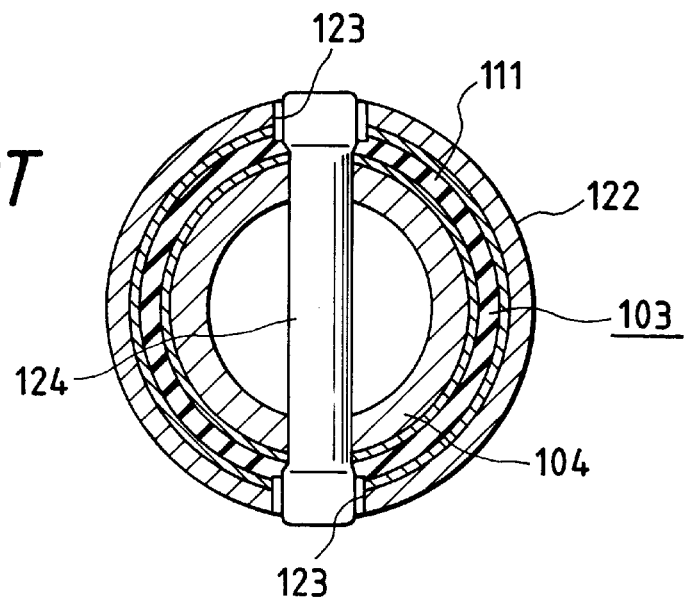
FIG. 24 is a sectional view taken substantially along the line XXIV—XXIV of FIG. 23.
Figure 25:
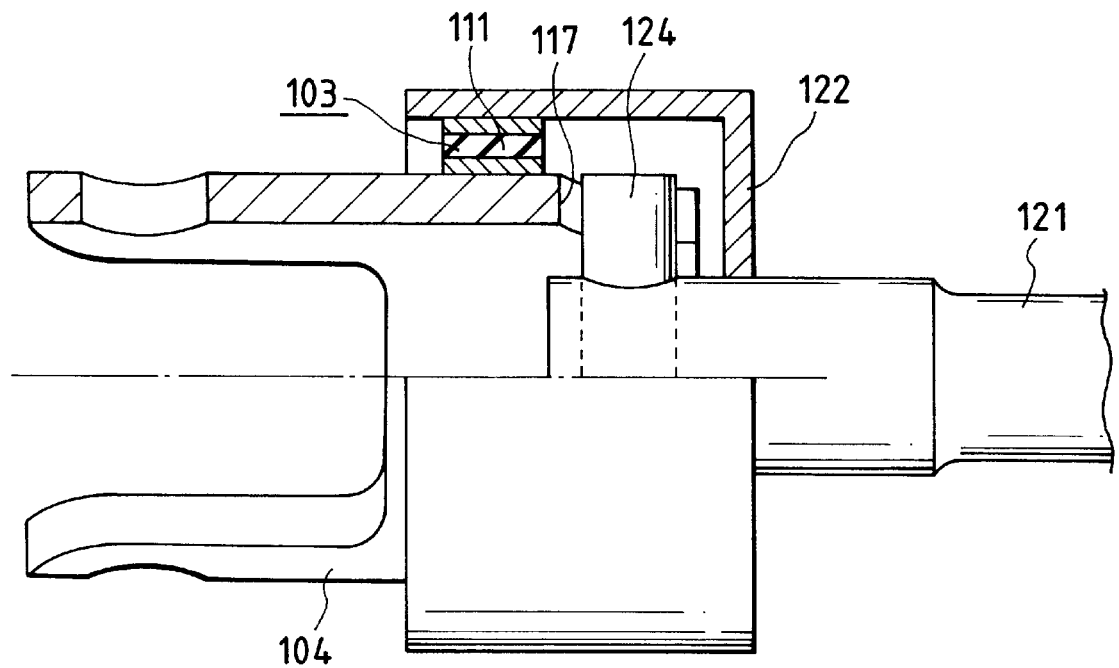
FIG. 25 is a partially cut-away side view illustrating a third example of the conventional structure.

Next, the item (b) will be explained. The buffer drum 3 prevents vibrations of the external sleeve 13 fixed to the first yoke 4 from being transmitted up to the internal sleeve 12 fixed to the shaft 2a by interposing the elastic material 11 between the internal sleeve 12 and the external sleeve 13. It is therefore required that each of the constructive members be assembled so as not to make the external sleeve 12 contact with the transmission member 21 fixed to the shaft 2a. In the case of the above-described conventional structure, it is required that the operation be performed while regulating a press-fitting quantity of the internal sleeve 12 with respect to the shaft 2a (FIGS. 13 and 14). The press-fitting operation is troublesome, and, also, a scatter in the press-fitting quantity can occur. The scatter in terms of the press-fitting quantity leads directly to a scatter in dimension of an elastic universal joint in the axial direction and is therefore undesirable in terms of quality. Such problems can be obviated by such an arrangement that the front end of the internal sleeve 12 is more protruded in the axial direction than the front end of the external sleeve 13. Instead, however, there arise problems in which a directivity is produced in the case of assembling the buffer drum 3, and both assembly and manufacturing of the buffer drum 3 are troublesome.

Contrastingly in the case of the illustrative embodiment, if the internal sleeve 12 is externally fitted to the large-diameter portion 22 of the shaft 2a till the front end of the internal sleeve 12 impinges on the stepped portion 24, the press-fitting quantity of this internal sleeve 12 can be regulated, and a contact between the external sleeve 13 and the transmission member 21 can be prevented. For this reason, an anti-vibration effect can be obtained without making the assembly of the buffer drum 3 troublesome or increasing the manufacturing costs.

Figure 5:
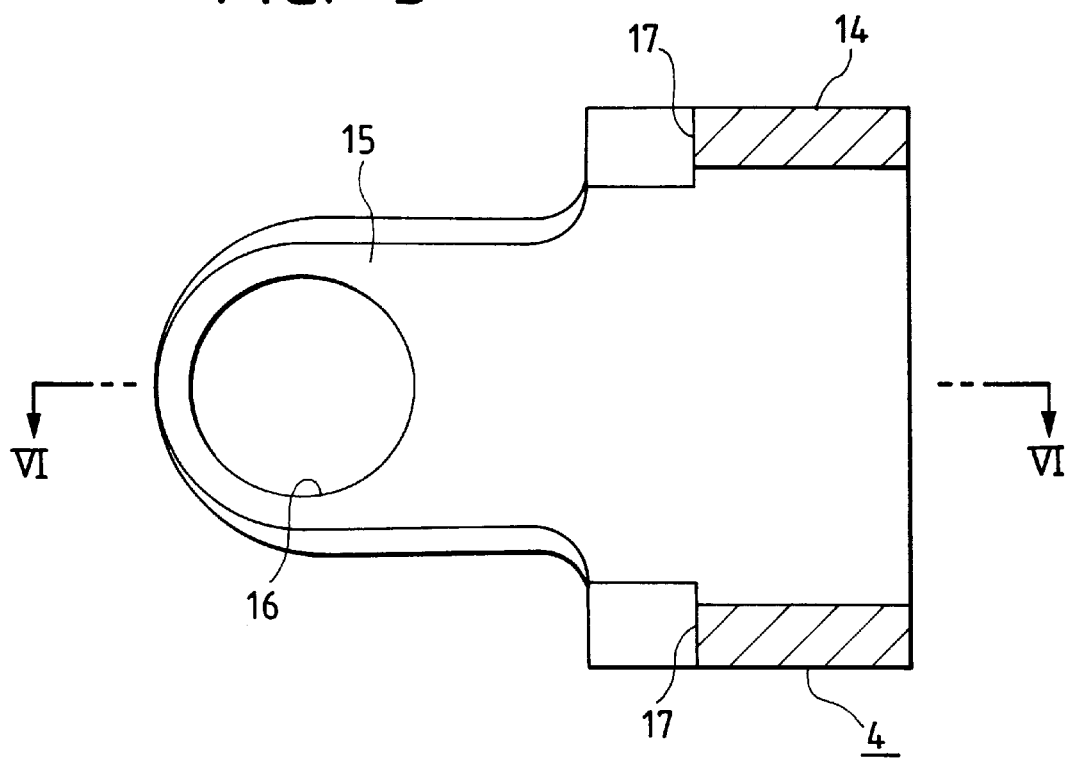
FIG. 5 is a view illustrating only a first yoke of FIG. 2.
Figure 6:
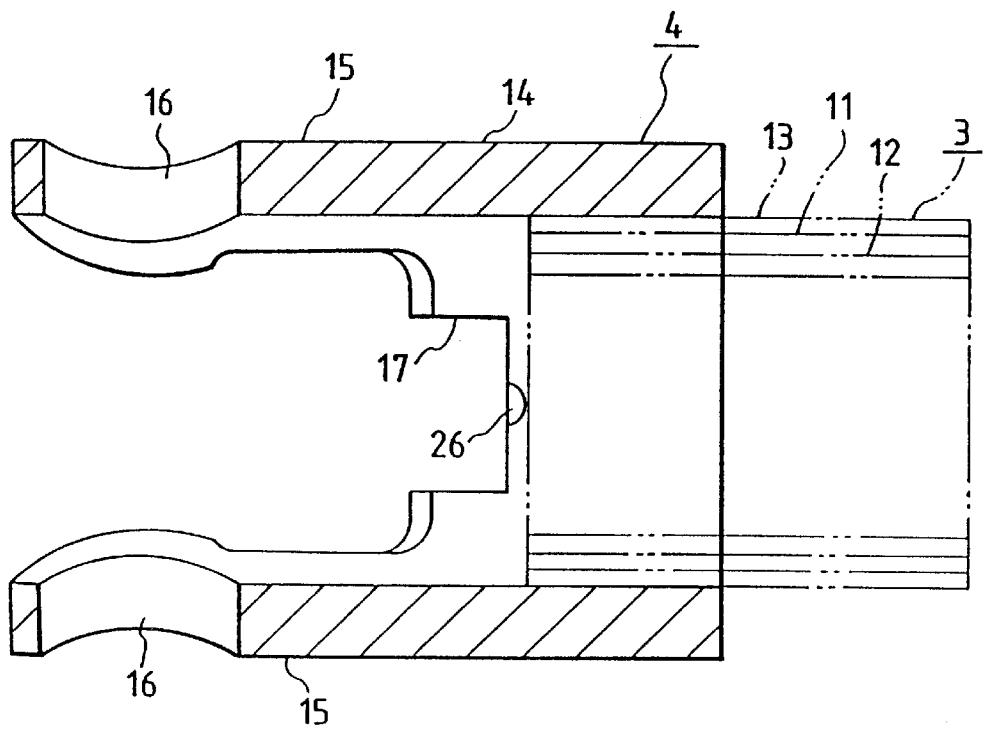
FIG. 6 is a sectional view taken substantially along the line VI—VI of FIG. 5.

On the other hand, the first yoke 4 includes, as illustrated in FIGS. 5 and 6, a cylindrical unit 14 defined as a cylinder member and a pair of first arms 15, 15 formed at one edge (a left edge in FIGS. 1, 2, 5 and 6) of the cylindrical unit 14 in the axial direction (the right-and-left directions in FIGS. 5 and 6) and extending in the axial direction from face-to-face positions in the diametrical direction. Then, first circular holes 16, 16 are formed coaxially with each other in front ends (left ends in FIGS. 5 and 6) of the first arms 15, 15. Further, notches 17, 17 are respectively formed in areas off the pair of first arms 15, 15 in opposed positions of one edge portion of the cylindrical unit 14 in the axial direction. The width of these notches 17, 17 is larger than the width of the protruded segments 10a, 10a of the transmission member 21. Then, where the shaft 2a is assembled inwardly of the first yoke 4, the respective protruded segments 10a, 10a loosely engage with the insides of the notches 17, 17 with some gaps.

Figure 7:
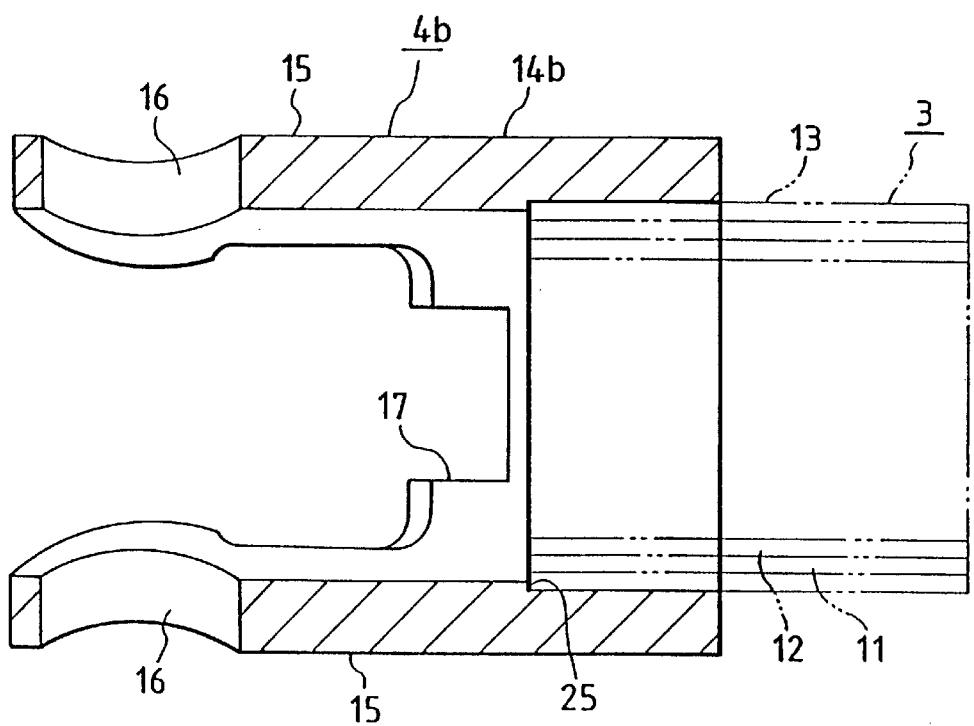
FIG. 7 is a view similar to FIG. 6 but illustrates an example of a configuration disadvantageous in terms of manufacturing costs.

Further, as shown in FIG. 6, the internal peripheral surface of the cylindrical unit 14 is not provided with a stepped portion 25 like that of cylinder 14b shown in FIG. 7, but is formed as a simple cylinder wherein a minor diameter does not change along the axial direction. Also, a caulked protruded segment 26 is formed by caulk-bending the edge central portion of each notch 17 inward in the diametrical direction. The external sleeve 13 of the buffer drum 3 is internally fitted in the cylindrical unit 14, and, in this state, the front edge of this external sleeve 13 impinges on the caulked protruded segment 26, thereby positioning the external sleeve 13 with respect to the first yoke 4. The operation of forming the above caulked protruded segment 26 is easier than the operation of forming the above stepped portion 25 (FIG. 7), and, correspondingly, reduces the costs of manufacturing the first yoke 4 and the elastic universal joint 1a.

Furthermore, the second yoke 5 is made by press-working, e.g., a thick metal plate and includes a pair of second arms 18, 18 spaced away from each other. The thus constructed second yoke 5 is fixedly joined to an end of another shaft 19 (see FIG. 13) by tightly fastening an unillustrated bolt. Second circular holes 20, 20 are respectively formed coaxially with each other near front edges (a right downward portion in FIG. 1) of the second arms 18, 18. Then, four ends of the cross shaft 6 are rotatably supported on the internal areas of the two first and second circular holes 16, 20 formed by one pair through radial needle bearings 28, 28 constructed including bearing cups 27, 27.

An operation of the thus constructed elastic universal joint 1a is as follows. When an automobile runs straight, or when a rotational torque applied to the shaft 2a from a steering wheel is small, the protruded segments 10a, 10a of the transmission member 21 fixed to the front end of the shaft 2a exist in neutral positions or positions deviating a bit from the neutral positions inwardly of the notches 17, 17 formed in the cylindrical unit 14 of the first yoke 4. Then, in each of those states, the cylindrical unit 14 does not directly contact the transmission member 21 at all. Further, the small rotational torque is transmitted from the shaft 2a via the buffer drum 3 to the first yoke 4. In this case, the elastic material 11 constituting the buffer drum 3 absorbs the vibrations transferred from the wheels to the first yoke 4 via the steering gear, another shaft 19, the second yoke 5 and the cross shaft 6, with the result that the vibrations are not transmitted to the shaft 2a.

In contrast with this, when the rotational torque applied to the shaft 2a from the steering wheel is large as in the case of giving a large steering angle to the front wheel, the respective protruded segments 10a, 10a impinge on the inner surfaces of the notches 17, 17. As a result, a large proportion of the rotational torque applied from the steering wheel to the shaft 2a is transmitted via the transmission member 21 to the first yoke 4. In this state, the rotational torque transmitted via the buffer drum 3 is limited. Accordingly, even if the rotational torque transmitted via the elastic universal joint 1a increases, there is eliminated such a possibility that an excessive force acts on the elastic material 11 of the buffer drum 3, thereby preventing this elastic material 11 from being damaged.

Further, in the case of the elastic universal joint of the first embodiment, because of the existence of the concave portion 29 formed in the front end surface of the shaft 2a, even when decreasing a distance between this front end surface and the second yoke 5, the front edge of the second arm 18 constituting the second yoke 5 does not interfere with the front end surface of the shaft 2a. That is, when the second yoke 5 swings about the cross shaft 6, the front edge of the second arm 18 approaches the above front end surface while describing circular-arc locus about the cross shaft 6. The front edge described above comes closest to the front end surface, and, in this state, the central portion of the front end surface faces to the front edge. In the case of the elastic universal joint of the present invention, because of the existence of the concave portion 29 at the central portion of the front end surface, the front end surface is hard to interfere with the front edge. Accordingly, there is no need to increase a size of the first yoke 4 in order to prevent the interference, and the elastic universal joint 1a can be downsized and have a smaller weight. In other terms, it is possible to make the second yoke 5 approach the shaft 2a, corresponding to a depth of the concave portion 29, and the downsizing of the first yoke 4 is thereby attainable. Then, with this downsizing, an entire length of the first yoke 4 decreases, and the moldability of this first yoke 4 by drawing is improved, resulting in lower manufacturing costs.

Figure 8:
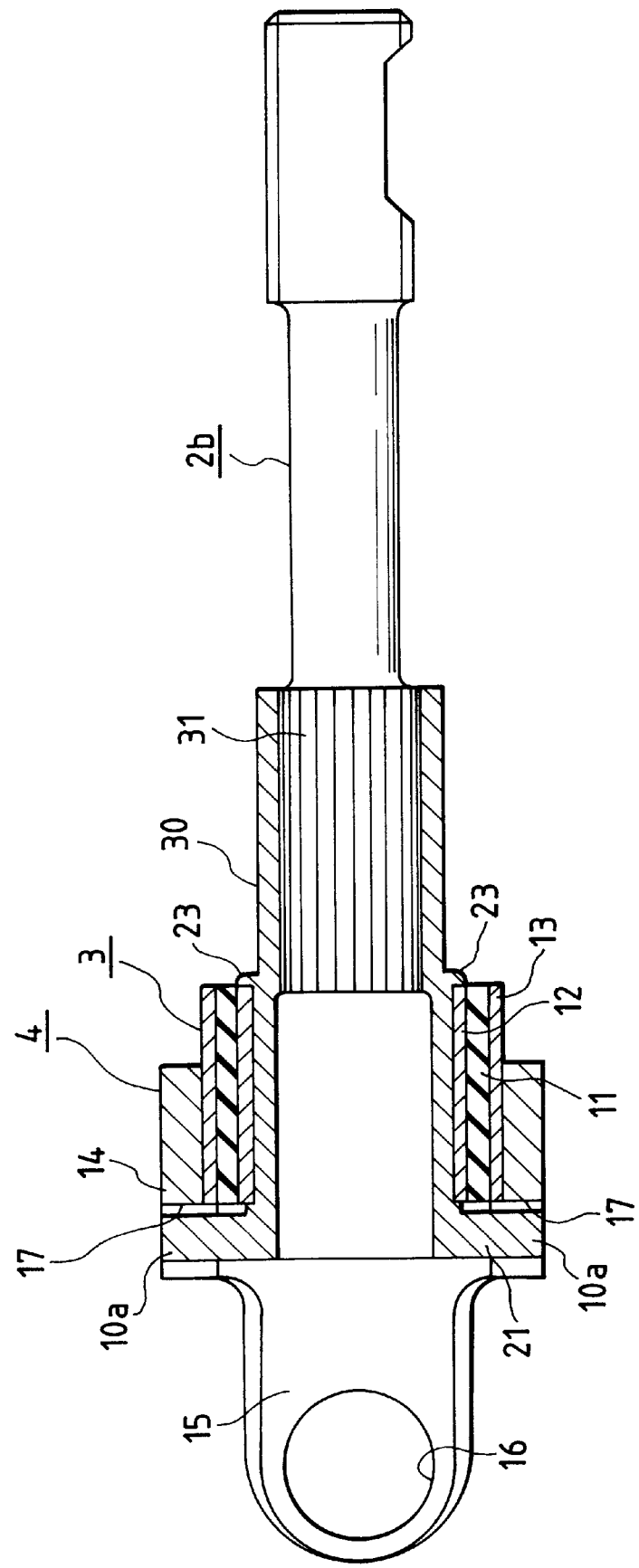
FIG. 8 is side view with partially cut away, showing a second embodiment of the present invention.
Figure 9:
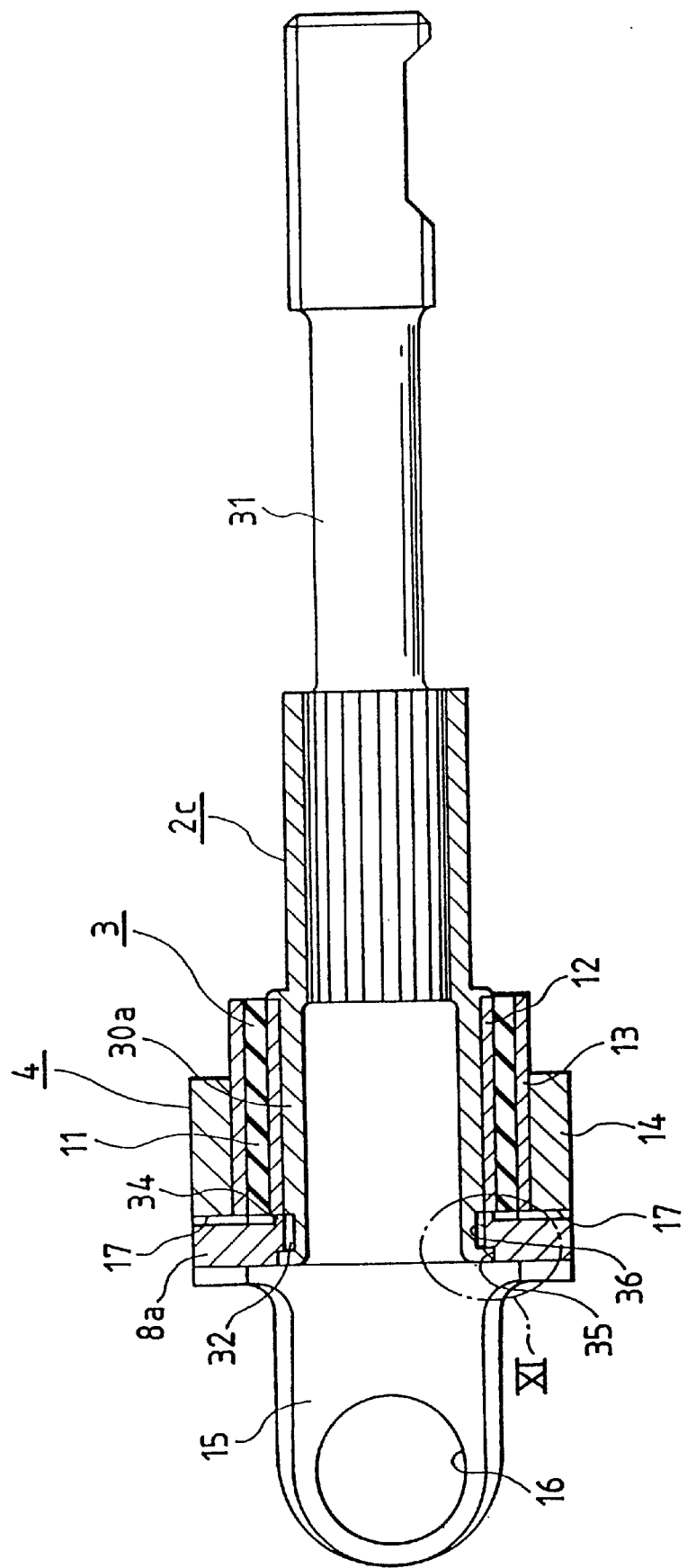
FIG. 9 is a side view partially cut away, showing a third embodiment of the present invention.
Figure 10:
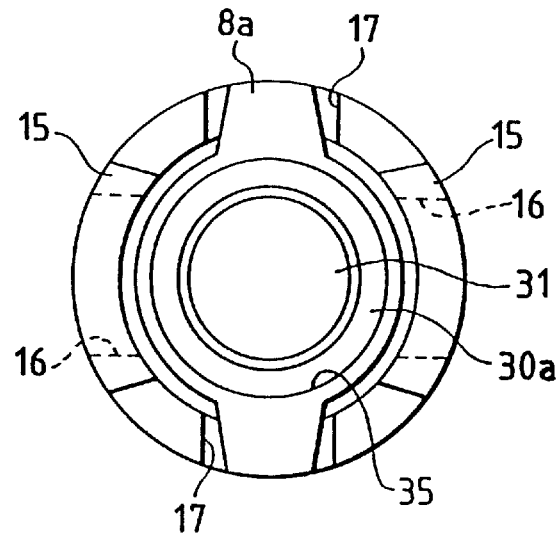
FIG. 10 is a diagram as viewed from left in FIG. 9.
Figure 11:
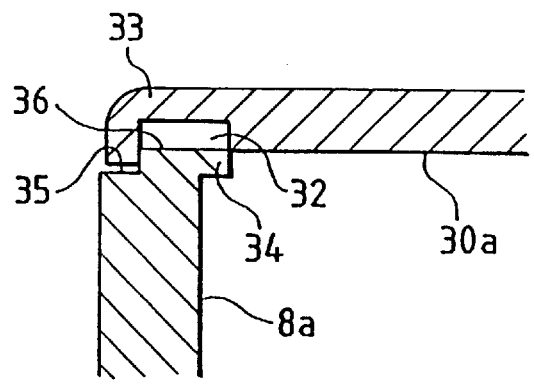
FIG. 11 an enlarged view of a portion XI in FIG. 9 but illustrates an engaged portion between the front end of an outer shaft and a transmission member in an as-engaged state.
Figure 12:
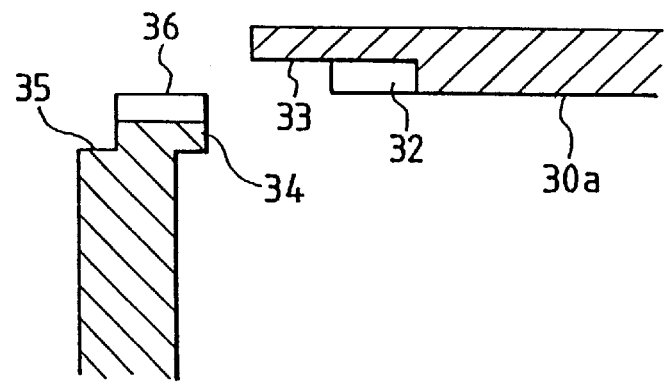
FIG. 12 is an enlarged view of the portion XI in FIG. 9 but similarly illustrates the same engaged portion in a pre-engagement state.

Next, FIG. 8 illustrates a second embodiment of the present invention. The second embodiment adopts a so-called collapsible shaft, wherein an entire length of a shaft 2b fixedly connecting the first yoke 4 to the front end thereof (the left end in FIG. 8) is reduced when undergoing an impact. Therefore, in accordance with the second embodiment, the shaft 2b is constructed so that an outer shaft 30 taking an annular tube-like shape and an inner shaft 31 assuming an annular rod-like shape are slidably combined. Accordingly, a proximal half portion (a right half portion in FIG. 8) of the outer shaft 30 has a smaller diameter than a front half portion (a left half portion in FIG. 8), and a female serration groove is formed in an internal peripheral surface of this proximal half portion. Further, a front edge (a left edge in FIG. 8) of the inner shaft 31 has a larger diameter than other portions, and a male serration groove is formed on an outer peripheral surface of this front edge thereof, with the result that the male serration groove engages with the female serration groove. Further, a friction adjusting member composed of a synthetic resin, etc. is provided at part of the engaged portion between those serration grooves and is formed to slide in the axial direction (right-and-left directions in FIG. 8) only when the engaged portion between the two serration grooves undergoes a large impact concomitant with a collision.

In the case of this embodiment, the outer shaft 30 constituting the front half portion of the shaft 2b takes the annular tube-like shape, and the front end of this outer shaft 30 is opened to the front end surface of the shaft 2b. Accordingly, the existence of the internal space defined as a concave portion or a hole serves to prevent the interference between the front edge of a second arm (not shown) of the second yoke (not shown) and the front end surface of the outer shaft 30, and, correspondingly, the first yoke 4 can be downsized and have a smaller weight. Other configurations and operations are the same as those in the first embodiment.

Next, FIGS. 9 to 12 illustrate a third embodiment of the present invention. In both of the first and second embodiments discussed above, the transmission member 21 is formed integrally with each of the front ends of the shafts 2a, 2b (the transmission member 21 is formed integrally with the front end of the outer shaft 30 in the second embodiment). In contrast with this, the third embodiment has such an arrangement that a transmission member 8a formed separately from an outer shaft 30a is fixedly connected to a front end (a left end in FIG. 9) of the outer shaft 30a of a shaft 2c based on a collapsible structure.

More specifically, in the case of the third embodiment, a male serration groove 32 is formed on an outer peripheral surface of the front end of the outer shaft 30a, and, further, a front edge protruding from this male serration groove 32 is formed as a thin wall portion whose outer diametrical dimension becomes smaller. On the other hand, an inner circumferential area of the transmission member 8a is formed respectively with a ring-like protrusion 34 provided along the entire periphery of one side thereof but extending in the axial direction (a right direction in FIGS. 9, 11 and 12) and a ring-like recessed portion 35 provided in the other side thereof (a left surface in FIGS. 9, 11 and 12). Further, a female serration groove 36 is also formed in the inner circumferential area of the transmission member 8a.

A fixed connection of the transmission member 8a to the front end of the outer shaft 30a involves engaging the male serration groove 32 with the female serration groove 36 by directing the ring-like protrusion 34 toward an inner part of the male serration groove 32. Then, after the engagement therebetween, the above thin wall portion 33 is expanded outward in the diametrical direction and pressed against the ring-like recessed portion 35. As a result, the outer shaft 30a is fixed connected to the transmission member 8a in an inseparable manner. Furthermore, the ring-like protrusion 34 impinges on the front edge (the left edge in FIG. 9) of the inner sleeve 12 of the buffer drum 3 protruding in the axial direction, thus preventing a contact between the front edge (the left edge in FIG. 9) of the outer sleeve 13 and the transmission member 8a. Other configurations and operations are the same as those in the second embodiment discussed above.

The elastic universal joint according to the present invention, which is constructed and operates as described above, can be compact and lightweight while providing a large bending angle of the shafts connected to each other through the elastic universal joint.

FIGS. 16 and 17 illustrate a fourth embodiment of the present invention. An elastic universal joint 10 according to the present invention, as shown in FIG. 16, includes a shaft 102a and a coupling bracket 125 having its proximal end fixedly connected to a close-to-top-end area (a close-to-left area in FIG. 16) of an intermediate portion of the shaft 102a. The elastic universal joint 101a also includes a first yoke 104 internally fixedly fitted to the inside area of an external cylindrical member 126 provided at the front edge of the coupling bracket 125 through a buffer drum 103, a second yoke 105 and a cross shaft 106 for connecting this second yoke 105 to the first yoke 104. Further, a collar-like transmission member 127 taking a configuration as shown in FIG. 17 is formed integrally with the shaft 102a by a proper working method such as cold forging working, etc. in an area positioned inward in the diametrical direction of the buffer drum 103 at the front end of the shaft 102a. Further, protruded segments 110a, 110a are integrally formed in two opposite positions in the diametrical direction on the outer circumference of this transmission member 121, and tips of these protruded segments 110a, 110a are arranged in an opposite relationship with the inner peripheral surface of the buffer drum 103.

A concave portion 128 is, as illustrated in FIGS. 16 and 17, formed at the central portion of the transmission member 127 that may be also conceived as the central portion on the front end surface of the shaft 102a. In the case of the illustrative embodiment, this concave portion 128 has a spherical concave surface including its opening taking a circular shape. Accordingly, this concave portion 128 is deepest at its central area but gradually becomes shallower as it approaches the circumference.

Further, the above buffer drum 103 is, as in the same way with the conventional structure described above, formed in the cylindrical shape as a whole in such an arrangement that an outer peripheral surface of an internal sleeve 112 is connected to an inner peripheral surface of an elastic material 111 by baking or bonding, and an inner peripheral surface of an external sleeve 113 is similarly connected to an outer peripheral surface of the elastic material 111. Then, the internal sleeve 112 is externally fixedly fitted to a cylindrical unit 114 which will be mentioned later but provided to the first yoke 104, and one half portion (a right half portion in FIG. 16) of the external sleeve 113 is internally fixed to an external cylindrical member 126 of the coupling bracket 125. In this state, the other half portion (a left half portion in FIG. 16) of the internal sleeve 112 of the buffer drum 103 is slightly protruded (within a range so as not to interfere with second arms 118, 118 which will be stated later) relative to a front edge (a left edge in FIG. 16) of the cylindrical unit 114. In the case of this embodiment, the coupling bracket 125 is formed in a crank shape in section but a ring-like shape as a whole by performing the press-working or drawing on a metal plate such as a steel sheet, a stainless steel sheet, etc. Then, a coupling cylindrical member 132 formed at the central portion of this coupling bracket 125 is externally fixedly fitted to the shaft 102a. Note that the coupling cylindrical member 132 is externally fitted, and, thereafter, the coupling bracket 125 is prevented from coming off by caulk-expanding part of the shaft 102a in the diametrical direction.

On the other hand, the first yoke 104 has the cylindrical unit 114 serving as an internal cylindrical unit and a pair of first arms 115 formed at one edge (a left edge in FIG. 16) of the cylindrical unit 114 in the axial direction (right-and-left directions in FIG. 16) and extending in the axial direction from face-to-face positions thereof. Then, first circular holes 116 (see FIGS. 18 and 19 illustrating a fifth embodiment which will hereinafter be discussed) are formed coaxially with each other near front edges (left edges in FIG. 16) of the respective first arms 115. Further, notches 117, 117 are respectively formed in areas off the pair of first arms 115, 115 in opposite positions of one edge portion of the cylindrical unit 114 in the axial direction. Dimensions of widths of these notches 117, 117 are larger than dimensions of widths of the protruded segments 110a, 110a of the transmission member 127. Then, in a state where the shaft 102a is assembled inwardly of the first yoke 104, the respective protruded segments 110a, 110a loosely engage with the insides of the notches 117, 117 with some gaps. As obvious from the above discussion as well as from FIG. 16, this engaged portion exists inward in the diametrical direction of the buffer drum 103.

Furthermore, the second yoke 105 is made by press-working, e.g., a thick metal plate and includes a pair of second arms 118, 118 spaced away from each other. The thus constructed second yoke 105 is fixedly joined to an edge of another shaft 119 (see FIG. 13) by tightly fastening an unillustrated bolt. Second circular holes 120, 120 are respectively formed coaxially with each other near front edges (a right downward portion in FIG. 16) of the second arms 118, 118. Then, four ends of the cross shaft 106 are rotatably supported on the internal areas of the two first and second circular holes 116, 120 formed by one pair through radial needle bearings 130, 130 constructed including bearing cups 129, 129.

An operation of the thus constructed elastic universal joint 101a is as follows. When the automobile runs straight, or when the rotational torque applied to the shaft 2a from the steering wheel is small, the protruded segments 110a, 110a of the transmission member 127 fixed to the front end of the shaft 102a exist in neutral positions or positions deviating a bit from the neutral positions inwardly of the notches 117, 117 formed in the cylindrical unit 114 of the first yoke 104. Then, in each of those states, the cylindrical unit 114 does not directly contact the transmission member 127 at all. Further, the small rotational torque is transmitted from the shaft 102a via the coupling bracket 125 and the buffer drum 103 to the first yoke 4. In this case, the elastic material 111 of the buffer drum 103 absorbs the vibrations transferred from the wheels to the first yoke 104 via the steering gear, another shaft 119, the second yoke 105 and the cross shaft 106, with the result that the vibrations are not transmitted to the shaft 102a. On this occasion, a magnitude of the rotational torque transferred via the coupling bracket 125 is limited.

In contrast with this, when the rotational torque applied to the shaft 102a from the steering wheel is larger as in the case of giving a large steering angle to the front wheels, the respective protruded segments 110a, 110a impinge on the inner surfaces of the notches 117, 117. As a result, a large proportion of the rotational torque applied from the steering wheel to the shaft 102a is transmitted via the transmission member 127 to the first yoke 104. In this state, the rotational torque transmitted via the buffer drum 103 is limited. Accordingly, even if the rotational torque transmitted via the elastic universal joint 101a increases, there is eliminated such a possibility that an excessive force acts on the elastic material 111 of the buffer drum 103, thereby preventing this elastic material 111 from being damaged.

As explained above, in the case of the elastic universal joint 101a, because of (not internally but) externally fixedly fitting the buffer drum 103 to the cylindrical unit 114 defined as an inside cylindrical unit, the diameter of this buffer drum 103 can be sufficiently increased. In consequence, even if a hardness of the elastic material 11 of this buffer drum 103 is not especially enhanced, a steering stability can be improved by enhancing a torsional rigidity of the buffer drum 103. Further, there is no necessity for increasing the hardness of the elastic material 11, and hence a good vibration attenuating effect by the buffer drum 103 can be achieved.

Moreover, the coupling bracket 125 inclusive of the external cylindrical member 126 in which the buffer drum 103 is internally fixedly fitted transmits not a large rotational torque but only a small rotational torque irrespective of a magnitude of the rotation torque transmitted via the elastic universal joint 101a. The large rotational torque is transmitted through no intermediary of the coupling bracket 125 by making the protruded segments 110a, 110a fixedly provided at the front edge of the shaft 102a impinge on the inside surfaces of the notches 117, 117 of the cylindrical unit 114 of the first yoke 104. Accordingly, the coupling bracket 125 is not required to have a particularly large rigidity. For this reason, a reduction in weight of the elastic universal joint 101a can be attained by thinning the coupling bracket 125.

Further, the engaged portions between the protruded segments 110a, 110a and the notches 117, 117 exist inwardly of the buffer drum 103 in the diametrical direction thereof, and, therefore, even when a length of this buffer drum 103 in the axial direction is secured in order to ensure a mass of the elastic material 111 of the buffer drum 103, a length of the elastic universal joint in the axial direction does not increase, thereby attaining the reduction in weight of the elastic universal joint.

Furthermore, in the case of the illustrative embodiment, even when decreasing a distance between the front end surface of the shaft 102a and the second yoke 105 on the basis of the existence of the concave portion 128 formed in the front end surface of the shaft 102a, the front edge of the second arm 118 of the second yoke 105 does not interfere with the front end surface of the shaft 102a. That is, when the second yoke 105 swings about the cross shaft 106, the front edge of the second arm 118 approaches the above front end surface while describing a circular-arc locus about the cross shaft 106. The front edge described above comes closest to the front end surface, and, in this state, the central portion of the front end surface faces to the front edge. In the case of the elastic universal joint of the present invention, because of the existence of the concave portion 128 at the central portion of the front end surface, the front end surface does not interfere with the front edge. Accordingly, there is no need to increase the size of the first yoke 104 in order to prevent the interference, and the elastic universal joint 101a can be downsized and have a smaller weight. In other words, it is possible to make the second yoke 105 approach the shaft 102a, corresponding to a depth of the concave portion 128, and the downsizing of the first yoke 104 is thereby attainable. Then, with this downsizing, an entire length of the first yoke 104 decreases, and the moldability of molding this first yoke 104 by drawing is improved, resulting in a reduction of manufacturing manufacturing costs.

Next, FIGS. 18 and 19 illustrate a fifth embodiment of the present invention. The fifth embodiment adopts the so-called collapsible shaft, wherein an entire length of a shaft 102b fixedly connecting the first yoke 104 to the front end thereof (the left end in FIG. 18) is reduced when undergoing an impact. Therefore, in accordance with the fifth embodiment, the shaft 102b is constructed so that an outer shaft 131 taking an annular tube-like shape and an inner shaft 133 assuming an annular rod-like shape are slidably combined. Accordingly, a proximal half portion (a right half portion in FIG. 18) of the outer shaft 131 has a smaller diameter than a front half portion (a left half portion in FIG. 18), and a female serration groove is formed in an internal peripheral surface of this proximal half portion. Further, a front end (a left end in FIG. 18) of the inner shaft 131 has a larger diameter than other portions, and a male serration groove is formed on an outer peripheral surface of this front end thereof, with the result that the male serration groove engages with the female serration groove. Further, a friction adjusting member composed of a synthetic resin, etc. is provided at part of the engaged portion between those serration grooves and is formed to slide in the axial direction (right-and-left directions in FIG. 18) only when the engaged portion between the two serration grooves undergoes a large impact concomitant with a collision.

In the case of this embodiment, the outer shaft 131 constituting the front half portion of the shaft 102b takes the annular tube-like shape, and the front end of this outer shaft 131 is opened to the front end surface of the shaft 102b. Accordingly, the existence of the internal space defined as a concave portion or a hole serves to prevent the interference between the front edge of the second arm 118 (FIG. 16) of the second yoke 105 and the front end surface of the outer shaft 131, and, correspondingly, the first yoke 104 can be downsized and have a smaller weight. Other configurations and operations are the same as those in the fourth embodiment.

Next, FIGS. 20 and 21 illustrate sixth and seventh embodiments of the present invention. In both of the sixth and seventh embodiments, an external buffer drum 136 is provided between an outer peripheral surface 114 of the first yoke 104 and an inner peripheral surface of an external cylindrical member 126 of a coupling bracket 125. An internal buffer drum 127 is provided between an inner peripheral surface of the cylindrical unit 114 and an outer peripheral surface of a shaft 121. The external buffer drum 136 is disposed concentrically with the internal buffer drum 137. Thus, the external and internal buffer drums 136 and 137 are dually provided on the outer and inner peripheral sides of the cylindrical unit 114. With this arrangement, it is possible to increase a volume of the elastic materials 111, 111 per unit length that exist between the shaft 121 and the first yoke 104. Therefore, in the case of equalizing hardness of the elastic materials 111, 111 of the internal and external buffer drums 136, 137, the torsional rigidity can be more improved. Hence, both of the steering stability and the vibration attenuating performance can be enhanced. Further, the lengths of the buffer drums 136, 137 in the axial direction can be made smaller than in the case of providing the single buffer drum. Then, the elastic universal joint can be downsized and have a smaller weight corresponding to the reductions in the lengths thereof.

Note that the protruded segments 110a, 110a impinge on the edge of the internal buffer drum 137, and the vibrations are prevented from being transmitted via the impingement portion in this embodiment. Therefore, a stepped portion is formed at the front end of the shaft 121, and one edge of the internal sleeve 112 of the internal buffer drum 137 collides against this stepped portion 134. Further, another stepped portion 135 formed in a close-to-front-end area of the intermediate portion of the shaft 121 is caulk-expanded outward in the diametrical direction, thereby regulating the other edge of the internal sleeve 112. Accordingly, this internal sleeve 112 is fixed in a predetermined position of the front end of the shaft 121. Moreover, a portion for externally fixedly fitting the external sleeve 113 is formed thinner than other portions, thereby preventing an increase in dimension of a major diameter of the portion to which this external sleeve 113 is fixed. Furthermore, the fine rugged area is formed on an outer peripheral surface of the front end of the shaft 121 by knurling, thus preventing a rotation of the internal sleeve 112 about this shaft 121. Other configurations and operations are the same as those in the fourth and fifth embodiments discussed above.

Next, FIG. 22 illustrates an eighth embodiment of the present invention. In the case of the eighth embodiment, a coupling bracket 125a is formed in substantially C-like shape in section, and a coupling cylindrical member 132 provided at its central portion is positioned inwardly of the cylindrical unit of the first yoke 104. In accordance with the eighth embodiment, the coupling cylindrical member 132 is disposed inwardly of the external cylindrical member 126. Not only this makes it possible to reduce the dimension in the axial direction, but also the coupling bracket 125a is hard to bend-deform with respect to the shaft 102b even when a bending stress is applied to the coupling bracket 125a from the buffer drum 103. That is, in the fourth through seventh embodiments discussed above, a bending center exists off the external cylindrical member 126 in the axial direction, and, hence, if the stress along the diametrical direction acts on the external cylindrical member 126, the external cylindrical member 126 is easy to deform in an inclined direction with respect to the shaft 102b according to the principle of a lever. Whereas in this embodiment, the bending center exists inwardly of the external cylindrical member 126, and, therefore, the external cylindrical member 126 is hard to deform in the inclined direction with respect to the shaft 102b. Note that the transmission member 127 is formed integrally with the shaft, but a separate transmission member may also be fixed thereto afterward in each of the illustrative embodiments.

The elastic universal joint of the present invention is constructed and operates as described above, and it is therefore possible to attain both the steering stability and the vibration attenuating performance and reduce the weight. Furthermore, the elastic universal joint can be downsized and have a smaller weight as the necessity arises.

It is apparent that a wide range of different working modes can be formed without deviating from the spirit and scope of the invention.

What is claimed is:

1. A universal joint comprising:
   a transmission portion including a shaft having a transmission member thereon;
   a buffer drum;
   a first yoke attached to a front end of said shaft through said buffer drum, said first yoke having a cylindrical member, a pair of notches formed in a front edge of said cylindrical member, and a pair of arms formed with opposed holes and projecting from the front edge of said cylindrical member;
   a second yoke having a pair of arms formed with a pair of opposed holes; and
   a cross shaft received in said holes of said first and second yokes for rotatably connecting said first and second yokes to each other,
   wherein said transmission member has portions received in loose engagement with said pair of notches of said first yoke; and
   wherein a front end of said transmission portion includes one of a concave portion and a hole that provides a clearance in which the arms of said second yoke can move.

2. The universal joint of claim 1, wherein said transmission member is disposed between the arms of said first yoke and said buffer drum.

3. The universal joint of claim 1, wherein said buffer drum includes an outer cylindrical sleeve and an inner cylindrical sleeve received within said outer sleeve and joined to said outer sleeve through an intervening elastic cylindrical member, and
   wherein a spacer, having a radius no greater than an outer radius of said elastic cylindrical member, is provided to connect said transmission member to an axial end face of said shaft.

4. The universal joint of claim 1, wherein said buffer drum projects from a rear end of said cylindrical member of said first yoke.

5. The universal joint of claim 1, wherein said transmission member is ring-shaped and mounted on a peripheral surface of said shaft.

6. The universal joint of claim 5, wherein said transmission member has a serrated portion engaged with a serrated portion of said shaft, and said shaft further includes a pressing portion that retains said transmission member on said peripheral surface of said shaft.

7. The universal joint of claim 1, wherein said shaft includes an outer portion and an inner portion which normally are axially fixed relative to each other, but axially displaceable relative to each other when said shaft receives a large axial force.

8. The universal joint of claim 1, wherein said transmission member is formed integrally with said shaft.

9. The universal joint according to claim 1, wherein said first yoke is attached to said shaft through a coupling bracket that surrounds said first yoke and said buffer drum.

10. The universal joint according to claim 9, wherein said buffer drum connects said first yoke to said coupling bracket and said first yoke is also attached to said shaft through a second buffer drum that is surrounded by said first yoke.

11. The universal joint according to claim 9, wherein the coupling bracket has a cylindrical attachment portion that is disposed rearwardly of the buffer drum and that is disposed on said shaft.

12. The universal joint according to claim 9, wherein the coupling bracket has an attachment portion that is surrounded by said buffer drum and said first yoke and that is disposed on said shaft.

13. A universal joint comprising:
   a transmission portion including a shaft having a transmission member thereon;
   a buffer drum;
   a first yoke attached to a front end of said shaft through the buffer drum, said first yoke having a sleeve portion, a pair of arms formed with opposed holes, and a notch;
   a second yoke having a pair of arms formed with opposed holes; and
   a cross shaft received in said holes of said first and second yokes for rotatably connecting said first and second yokes to each other;
   wherein said transmission member is disposed between the arms of said first yoke and said buffer drum and has a portion received in loose engagement with said notch of said first yoke; and
   wherein a front end of said transmission portion includes one of a concave portion and a hole that provides a clearance in which the arms of said second yoke can move.

14. The universal joint of claim 13, wherein said notch is formed in said sleeve portion of said first yoke.

15. The universal joint of claim 14, wherein said notch is formed in a front edge of said sleeve portion of said first yoke.

16. The universal joint of claim 13, wherein said sleeve portion of said first yoke is cylindrical.

17. The universal joint of claim 13, wherein said transmission member is disposed substantially at an axial end face of said shaft.

18. The universal joint of claim 17, wherein said transmission member includes a body portion and a projecting portion extending from said body portion and received in loose engagement with said notch of said first yoke.

19. The universal joint of claim 8, wherein said body portion of said transmission member is circular.

20. The universal joint of claim 13, wherein said buffer drum includes an outer sleeve and an inner sleeve received within said outer sleeve and joined to said outer sleeve through an intervening elastic member, and
   wherein said transmission member is attached to said first shaft through a spacer that spaces said transmission member from said buffer drum such that vibration is not transmitted between said outer sleeve and said transmission member.

21. The universal joint of claim 13, wherein said buffer drum projects from a rear end of said sleeve portion of said first yoke.

22. The universal joint of claim 13, wherein said transmission member is ring-shaped and mounted on a peripheral surface of said shaft.

23. The universal joint of claim 22, wherein said transmission member has a serrated portion engaged with a serrated portion of said shaft, and said shaft further includes a pressing portion that retains said transmission member on said peripheral surface of said shaft.

24. The universal joint of claim 13, wherein said shaft includes an outer portion and an inner portion which normally are axially fixed relative to each other, but axially displaceable relative to each other when said shaft receives a large axial force.

25. The universal joint of claim 13, wherein said transmission member is formed integrally with said shaft.

26. The universal joint according to claim 13, wherein said first yoke is attached to said shaft through a coupling bracket that surrounds said first yoke and said buffer drum.

27. The universal joint according to claim 26, wherein said buffer drum connects said first yoke to said coupling bracket and said first yoke is also attached to said shaft through a second buffer drum that is surrounded by said first yoke.

28. The universal joint according to claim 26, wherein the coupling bracket has a cylindrical attachment portion that is disposed rearwardly of the buffer drum and that is disposed on said shaft.

* * * * *